(12) United States Patent
Szurdi et al.

(10) Patent No.: US 12,495,050 B2
(45) Date of Patent: Dec. 9, 2025

(54) METHODS TO DETECT MALICIOUS STOCKPILED DOMAIN NAMES

(71) Applicant: Palo Alto Networks, Inc., Santa Clara, CA (US)

(72) Inventors: Janos Szurdi, Sunnyvale, CA (US); Mohamed Yoosuf Mohamed Nabeel, San Jose, CA (US); Shehroze Farooqi, Sunnyvale, CA (US); George Morrison Jones, Warrenton, VA (US); Arun Bala Kumar, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 154 days.

(21) Appl. No.: 18/374,888

(22) Filed: Sep. 29, 2023

(65) Prior Publication Data

US 2025/0112935 A1    Apr. 3, 2025

(51) Int. Cl.
*H04L 9/40* (2022.01)

(52) U.S. Cl.
CPC .......... *H04L 63/1416* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 9,749,336 B1* | 8/2017 | Zhang | | H04L 63/14 |
| 9,830,453 B1* | 11/2017 | Feiertag | | G06F 21/562 |
| 11,652,845 B2* | 5/2023 | Chiba | | H04L 63/1483 |
| | | | | 726/23 |
| 2012/0265748 A1* | 10/2012 | Simpson | | H04L 61/302 |
| | | | | 707/E17.108 |
| 2020/0202181 A1* | 6/2020 | Yadav | | G06N 20/10 |
| 2022/0147815 A1* | 5/2022 | Conwell | | H04L 63/1425 |
| 2022/0150275 A1* | 5/2022 | McNee | | H04L 63/1441 |
| 2023/0118679 A1* | 4/2023 | Mayer | | H04L 63/1433 |
| | | | | 707/706 |
| 2024/0048569 A1* | 2/2024 | Shah | | H04L 63/1416 |

OTHER PUBLICATIONS

Almishari et al. Harvesting SSL Certificate Data to Identify Web-Fraud. International Journal of Network Security. vol. 14, No. 6, pp. 324-338, Nov. 2012.

Alsabah et al. Content-Agnostic Detection of Phishing Domains using Certificate Transparency and Passive DNS. RAID 2022, Oct. 26-28, 2022, Limassol, Cyprus.

Bijmans et al. Catching Phishers by Their Bait: Investigating the Dutch Phishing Landscape through Phishing Kit Detection. Proceedings of the 30th USENIX Security Symposium. Aug. 11-13, 2021.

(Continued)

*Primary Examiner* — Joseph P Hirl
*Assistant Examiner* — Hassan Saadoun
(74) *Attorney, Agent, or Firm* — Van Pelt, Yi & James LLP

(57) ABSTRACT

The present application discloses a method, system, and computer system for detecting stockpiled domains. The method includes (i) determining that a candidate domain is a malicious stockpiled domain using one or more of (a) a fingerprinting classification, (b) a heuristics-based classification, and (c) a machine learning classification, and (ii) applying a security policy based on a classification of the candidate domain as the malicious stockpiled domain.

19 Claims, 9 Drawing Sheets

(56) References Cited

OTHER PUBLICATIONS

Dong et al. Beyond the Lock Icon: Real-time Detection of Phishing Websites Using Public Key Certificates. IEEE 2015.

Drury et al. Certified Phishing: Taking a Look at Public Key Certificates of Phishing Websites. Proceedings of the Fifteenth Symposium on Usable Privacy and Security. Aug. 12-13, 2019.

GitHub—keredson/wordninja: Probabilistically split concatenated words using NLP based on English Wikipedia unigram frequencies. Feb. 14, 2023. https://github.com/keredson/wordninja.

GitHub—rrenaud/Gibberish-Detector: A small program to detect gibberish using a Markov Chain. Aug. 24, 2015: https://github.com/rrenaud/Gibberish-Detector.

\* cited by examiner

METHODS TO DETECT MALICIOUS STOCKPILED DOMAIN NAMES

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. As another example, such individuals may input command strings such as SQL input strings, etc., that cause a remote host to execute such command strings. As another example, such individuals develop webpages that host malware or other malicious content. The malware or other malicious content can turn a compromised computer into a "bot" in a "botnet," receiving instructions from and/or reporting data to a command and control (C&C) server under the control of the nefarious individual. One approach to mitigating the damage caused by exploit tools (e.g., malware, malicious command strings, etc.) is for a security company (or other appropriate entity) to attempt to identify exploit tools and prevent it from reaching/executing on end user computers. Another approach is to try to prevent compromised computers from communicating with the C&C server. Unfortunately, malicious authors are using increasingly sophisticated techniques to obfuscate the workings of their exploit tools. Accordingly, there exists an ongoing need for improved techniques to detect malware or exploits and prevent their harm.

BRIEF DESCRIPTION OF THE DRAWINGS

Various embodiments of the invention are disclosed in the following detailed description and the accompanying drawings.

DETAILED DESCRIPTION

Figure 1:
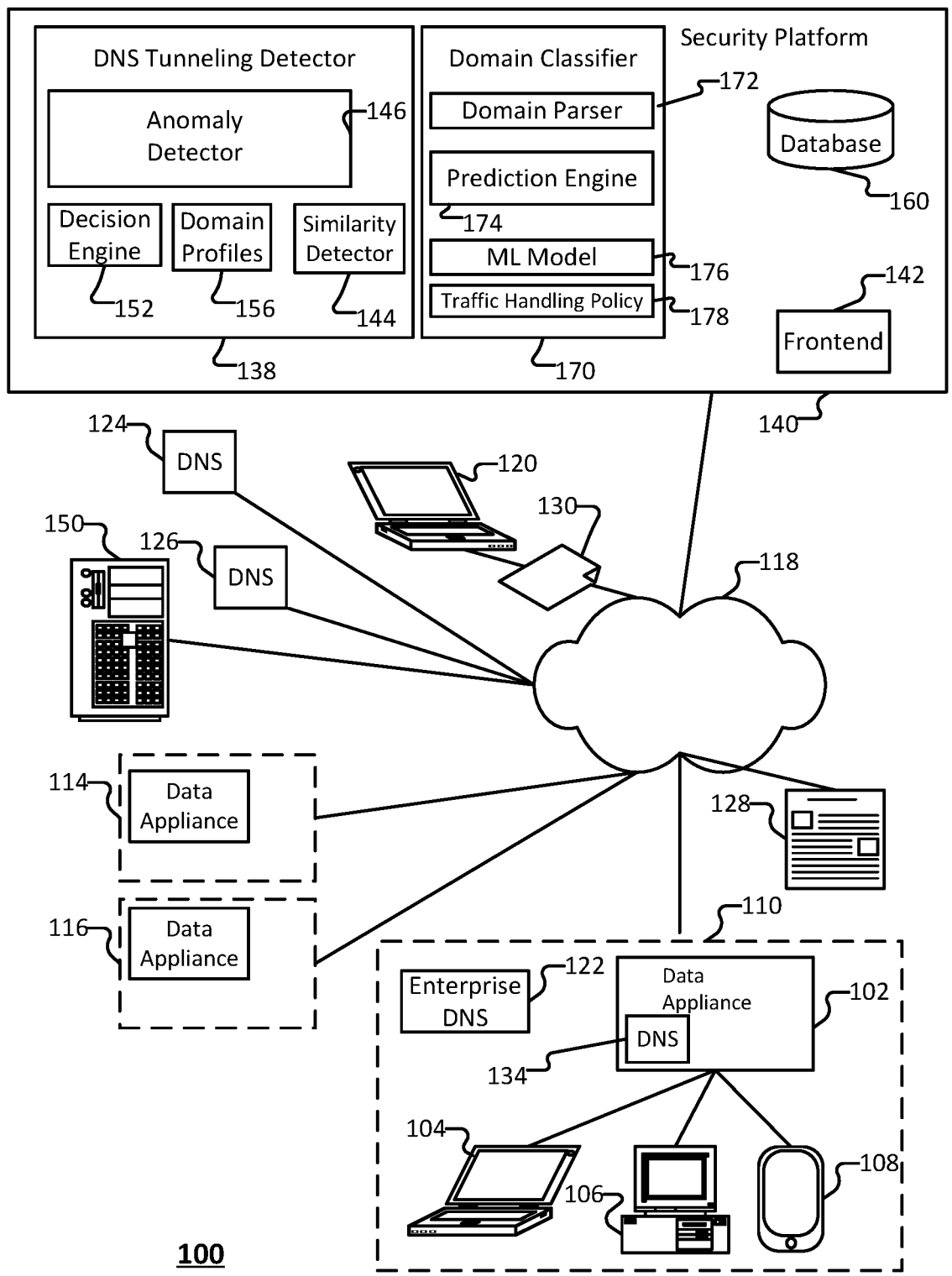
FIG. 1 is a block diagram of an environment in which a malicious domain is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a stockpiled domain includes a domain name that is purchased/registered in connection with other domain names by a malicious party that is intending to use the domain(s) for malicious purposes. At the time a particular domain is classified as a stockpiled the domain may not be used for malicious activity, however, the classification as a stockpiled domain enables a system to perform early detection of a malicious domain before it is used, and the system may perform an active measure to prevent/avoid the malicious activity.

As used herein, a new domain includes a domain for which a certificate is newly issued or registered.

Cyber criminals are becoming more sophisticated as security platforms develop new tools to identify malicious exploits. For example, cyber criminals generally register in bulk a set of domains that are intended to be deployed for malicious purposes. In connection with registering and deploying malicious domains in bulk, cyber criminals can automate their infrastructure configurations, such as DNS settings and certificates. Alternatively, cyber criminals may register malicious domains individually or in small batches. The automated techniques used by such cyber criminals generally leave traces of information in large datasets, such as certificate logs, passive DNS (pDNS) datasets, WHOIS datasets, and scan data datasets.

Various embodiments provide a system, method, or device for detecting malicious domains such as malicious stockpiled domains. The method includes (i) determining that a candidate domain is a malicious stockpiled domain using one or more of (a) a fingerprinting classification, (b) a heuristics-based classification, and (c) a machine learning classification, and (ii) applying a security policy based on a classification of the candidate domain as the malicious stockpiled domain.

Various embodiments provide a system, method, or device for training a classifier to classify a candidate domain as a malicious domain or a non-malicious domain. Additionally, or alternatively, the classifier may classify the candidate domain as a stockpiled domain or a non-stockpiled domain. The classifier may include a machine learning model that is trained based on a set of training candidate domains, which may include a first subset of benign domains (e.g., a set of non-stockpiled domains) and a second subset of malicious domains (e.g., a set of stockpiled domains). Training the machine learning model includes obtaining domain information for the set of training candidate domains, and performing a machine learning process to train the machine learning model.

In some embodiments, the classifier or model used in connection with generating a predicted machine learning-based classification is a machine learning model that is trained using a machine learning process. Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains a random forest machine learning domain classification model.

In some embodiments, the system obtains domain data used in connection with determining a domain classification. The domain data may include one or more of a certificate information pertaining to a certificate(s) associated with the candidate domain (e.g., the domain associated with the particular domain request), registration information, pDNS information, scan data, active DNS information, zone file information, etc. Various combinations of the types of domain data may be implemented. The system can obtain the domain data from one or more datasets, such as datasets provided by third-party service providers.

In response to obtaining the domain data, the system generates one or more features based on the domain data, and uses the features in connection with determining the machine learning domain classification. For example, the system extracts features from the domain data and queries the machine learning model to obtain a predicted domain classification.

In some embodiments, the system determines a domain classification for a candidate domain based at least in part on one or more of (a) a fingerprinting classification, (b) a heuristics-based classification, and (c) a machine learning classification. The system may implement one of the foregoing classification techniques or any combination thereof. The system may deem a candidate domain to be malicious or stockpiled in response to any one of the fingerprinting-based classification, heuristics-based classification or machine learning-based classification indicating (e.g., predicting) that the domain is malicious/stockpiled.

FIG. 1 is a block diagram of an environment in which a malicious domain is detected or suspected according to various embodiments. In various embodiments, system 100 is implemented in connection with system 200 of FIG. 2, system 300 of FIG. 3, process 400 of FIG. 4, process 500 of FIG. 5, process 600 of FIG. 6, process 700 of FIG. 7, process 800 of FIG. 8, and/or process 900 of FIG. 9.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or stockpiled domains, or such as traffic for certain applications (e.g., SaaS applications). In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including classifying domains (e.g., predicting whether a domain is a stockpiled domain), classifying network traffic, providing a mapping of signatures to certain domains (e.g., domains for which a predicted likelihood that the domain is a stockpiled domain exceeds a stockpiled likelihood threshold, etc. a mapping of domains to domain data (e.g., domain certificates, pDNS data, active DNS data, WHOIS data, etc.), performing static and dynamic analysis on malware samples, monitoring new domains (e.g., detecting new domains for which a certificate is issued/generated), assessing maliciousness of domains, determining whether domains are stockpiled domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, or domains are malicious, and providing an indication that an input string, file, or domain is malicious (or benign).

In some embodiments, security platform 140 classifies the domains in response to detecting a domain, such as a domain for which a new certificate is issued/registered. Security platform 140 may perform periodic polling or monitoring for new domains, such as by polling a certificate log for an indication of domains for which a certificate is issued/registered. Alternatively, or additionally, security platform 140 collects certificates (e.g., newly issued/registered certificates) in a stream of data. Security platform 140 may process the collected certificates in batches such as according to a predefined frequency (e.g., daily, weekly, etc.). The periodic polling or monitoring may be performed according to a predefined schedule or a predefined frequency or time period (e.g., daily, weekly, monthly, etc.). Additionally, or alternatively, security platform 140 determines (e.g., predicts) a domain classification in response to receiving a domain request from an endpoint or network entity, such as a data appliance or other firewall or security entity. For example, security platform 140 can perform the domain classification on a domain request basis as the endpoint or network entity detects traffic for a new domain or suspicious traffic to/from a domain.

In various embodiments, results of analysis (and additional information pertaining to applications, domains, etc.), such as an analysis or classification performed by security platform 140, are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remaining portions of security platform 140 provided by dedicated hardware owned by and under the control of the operator of security platform 140.

In some embodiments, domain classifier 170 detects/classifies a domain. For example, domain classifier 170 predicts whether a particular domain (e.g., a candidate domain) is a stockpiled domain. In some embodiments, domain classifier 170 additionally predicts whether a particular domain is a malicious domain. In some embodiments, domain classifier 170 classifies the domain based at least in part on a signature of the candidate domain, such as by querying a mapping of signatures to domain identifiers (e.g., a set of previously analyzed/classified applications). As an example, domain classifier 170 uses a signature or domain identifier to query a blacklist of domains to check whether the candidate domain is on the blacklist of domains. In some embodiments, domain classifier 170 classifies the domain based on a predicted domain classification (e.g., a prediction of whether a candidate domain is a stockpiled domain, whether the candidate domain is a malicious domain, or whether the candidate domain is benign, etc.). For example, domain classifier 170 determines (e.g., predicts) the domain classification based at least in part on domain data for the candidate domain. Examples of domain data include a certificate information pertaining to a certificate(s) associated with the candidate domain (e.g., the domain associated with the particular domain request), registration information, pDNS information, scan data, active DNS information, zone file information, etc.

In some embodiments, domain classifier 170 determines a domain classification for a candidate domain based at least in part on one or more of a fingerprinting-based classification, a heuristics-based classification, and a machine learning-based classification. As an example, domain classifier 170 uses multiple ones of a fingerprinting-based classification, a heuristics-based classification, and a machine learning-based classification, and determines that a candidate domain has a domain classification as a stockpiled domain or malicious domain if any one of the fingerprinting-based classification, the heuristics-based classification, and the machine learning-based classification indicates (e.g., predicts) that the domain is a stockpiled or malicious domain.

In some embodiments, domain classifier 170 includes a model (e.g., ML model 176) that is trained to detect stockpiled domains. In some embodiments, domain classifier 170 is additionally trained to detect malicious domains. In response to determining a predicted classification for a domain (e.g., a candidate domain), domain classifier 170 may determine a signature for the domain and store in a mapping of signatures to domains classifications (e.g., an indication of whether the candidate domain is malicious/stockpiled or benign/non-malicious/non-stockpiled) the domain signature in association with the predicted classification. In some embodiments, in response to determining a predicted classification for a domain (e.g., a candidate domain), domain classifier 170 may store an association between the IP address for network traffic and an indication of whether the IP address or associated domain is stockpiled (or additionally or alternatively, malicious) or non-stockpiled (or additionally or alternatively, benign/non-malicious). For example, domain classifier 170 identifies an IP address to/from which is being communicated (e.g., an IP address for the client device corresponding to a beacon in a C2 framework) and detects whether the IP address or associated domain is malicious (e.g., performs a domain classification to classify the domain as stockpiled/non-stockpiled or malicious/non-malicious).

In some embodiments, system 100 (e.g., domain classifier 170, security platform 140, etc.) trains a classifier (e.g., a model, such as ML model 176) to detect (e.g., predict) maliciousness for domains. For example, system 100 trains a classifier to perform domain classification (e.g., to classify domains as malicious or benign/non-malicious). As another example, system 100 trains a classifier to determine whether a candidate domain corresponds to a stockpiled domain. The classifier is trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a neural network (NN), etc. In some embodiments, domain classifier 170 implements a random forest model.

System 100 (e.g., domain classifier 170, security platform 140, etc.) performs feature extraction with respect to the candidate domain from domain data (e.g., certificates, registrant information, scan data, etc.). In some embodiments, system 100 (e.g., domain classifier 170) generates a set of features for training a machine learning model for classifying the domain (e.g., classifying whether the domain is stockpiled/non-stockpiled or malicious/non-malicious). System 100 then uses the set of features to train a machine learning model (e.g., a random forest model) such as based on training data that includes benign samples of domains and malicious samples of domains.

According to various embodiments, security platform 140 comprises DNS tunneling detector 138 and/or domain classifier 170. Security platform 140 may include various other services/modules, such as a malicious file detector, a malicious traffic detector, a parked domain detector, a stockpiled domain detector, an application classifier or other traffic classifier, etc. Domain classifier 170 is used in connection with analyzing samples of domains and/or automatically detecting stockpiled domains. For example, domain classifier 170 analyzes a candidate domain and predicts whether the domain is malicious or otherwise corresponds to a stockpiled domain. In response to receiving an indication that an assessment of a candidate domain (e.g., a domain classification, determine whether the candidate domain is stockpiled/non-stockpiled or malicious/benign, etc.) is to be performed, domain classifier 170 analyzes the candidate domain and obtains domain data for the candidate domain to determine the assessment of the candidate domain. For example, domain classifier 170 extracts certificate field information from certificate fields in the certificate(s) associated with the domain, optionally processes the certificate field information (e.g., convert the certificate field information to a predefined format), determines an embedding(s) or other feature vector for the certificate field information, and uses a machine learning model (e.g., a random forest model) to determine a machine learning-based predicted classification.

In some embodiments, in connection with determining the machine learning-based prediction classification, domain classifier 170 (i) receives an indication of a candidate domain, (ii) obtains information pertaining the candidate domain (e.g., domain data, etc.), (iii) determines a feature vector for the candidate domain based on the information pertaining to the candidate domain (e.g., determines a certificate field feature(s), registrant features), (iv) queries a model (e.g., a machine learning model), and (v) determines a domain classification, or otherwise whether the domain is stockpiled/non-stockpiled or malicious/benign based on the querying the model (e.g., domain classifier 170 obtains a predicted classification). In some embodiments, the determining the feature vector for the candidate domain (e.g., determining the certificate field embeddings) includes (a) parsing of the domain data for the candidate domain, (b) obtaining information for the candidate domain, (c) optionally processing the information to convert the information to a predefined format, and (d) generating the feature vector or embeddings based at least in part on the information for the candidate domain.

In some embodiments, domain classifier 170 classifies the traffic based on domain data. For example, domain classifier 170 obtains an indication of a domain to be classified, obtains domain data for the domain, and uses the domain data in connection with detecting a stockpiled domain or otherwise determining whether the associated domain is stockpiled/non-stockpiled or malicious/non-malicious.

In some embodiments, domain classifier 170 comprises one or more of domain parser 172, prediction engine 174 (e.g., a stockpiled domain detector), ML model 176, and/or traffic handling policy 178.

Domain parser 172 is used in connection with determining information pertaining to a domain, such as in connection with identifying certain elements of domain data for the domain. Domain parser 172 may query a dataset or third-party service(s) for domain data. For example, domain parser 172 may query a WHOIS database for registrant information, passive DNS (pDNS) datasets or logs, active DNS datasets or logs, certificate logs (e.g., to obtain certificates for the particular domain), etc. Domain parser 172 extracts information from the domain data (e.g., certificate fields from the associated certificate(s)) or the domain name itself. In response to extracting the information, domain parser 172 may format the information according to a predefined format. For example, domain parser 172 orders fields or information comprised in the domain data into a predefined order. In some embodiments, formatting the information according to the predefined format normalizes the information to be analyzed according to a fingerprinting technique or a machine learning model (e.g., a random forest model) to provide a generic detection across a plurality of types of frameworks.

Prediction engine 174 (e.g., the stockpiled domain detector) is used in connection with predicting a classification for the domain (e.g., the candidate domain), detecting a stockpiled domain, or otherwise predicting whether the corresponding domain is stockpiled/non-stockpiled or malicious/non-malicious. For example, prediction engine 174 predicts whether the domain associated with the domain is a stockpiled domain or whether traffic associated with (e.g., to/from) the domain is malicious traffic (e.g., based at least in part on the classification of the candidate as stockpiled/non-stockpiled or a likelihood that the candidate domain is a stockpiled domain).

In some embodiments, prediction engine 174 performs one or more of a fingerprinting-based classification, a heuristics-based classification, or a machine learning-based classification (e.g., by querying ML model 176.

The fingerprinting-based classification includes predicting whether the domain is a stockpiled domain (or additionally or alternatively, a malicious domain) based on obtaining a fingerprint for the candidate domain and matching the fingerprint against a set of fingerprints comprising one or more at least a subset of known stockpiled domains and/or at least a subset of known benign domains. In response to determining that a fingerprint for the candidate domain matches a fingerprint for a known stockpiled domain (e.g., a previously classified stockpiled domain), prediction engine 174 deems the candidate domain to be a stockpiled domain.

The heuristics-based classification includes predicting whether the domain is a stockpiled domain based on determining whether the candidate domain (e.g., one or more characteristics included in the domain data) matches one or more heuristic rules from a set of predefined heuristics rules. The heuristics rules may correspond to rules that when satisfied by a candidate domain are indicative of the candidate domain being a stockpiled domain. In response to determining that the candidate domain matches a predefined heuristic rule, prediction engine may deem the candidate domain to be a stockpiled domain. As an example, the heuristics rules are created such that they identify a group of domains where the majority of which matches with known stockpiled domains but none with any known benign or non-stockpiled domains.

The machine learning-based classification includes predicting whether the domain is a stockpiled domain based on querying a classifier for a prediction of the machine learning-based classification. The classifier may be a machine learning model that is trained on a dataset of domain data for a set of stockpiled domains (e.g., known malicious domains) and a set of benign domains (e.g., known benign domains). In some embodiments, prediction engine 174 uses a machine learning process to analyze the domain (e.g., candidate domain) or detect whether the domain is a stockpiled domain or otherwise a malicious domain. As an example, the machine learning process includes use of a classifier that is trained using a random forest machine learning technique. Using the machine learning process to analyze the domain (e.g., candidate domain) and/or detect stockpiled domains may include querying a classifier (e.g., a model), such as ML model 176. For example, prediction engine 174 queries the classifier based at least in part on the features determined for the candidate domain.

In some embodiments, the classifier (e.g., ML model 176) is trained using a machine learning process. For example, the classifier is a random forest model. The random forest model may be trained from a training set comprising a subset of benign domains (e.g., known or previously classified benign domains) and a subset of malicious domains (e.g., known or previously classified malicious/stockpiled domains).

In some embodiments, prediction engine 174 receives, from the machine learning model (e.g., ML model 176), an indication of a likelihood that the candidate domain corresponds to a stockpiled domain, a likelihood that the candidate domain is a malicious domain, or a likelihood that the candidate domain is benign/non-malicious domain. In response to receiving the indication of the likelihood that the candidate domain corresponds to a stockpiled domain, a likelihood that the candidate domain is a malicious domain, or a likelihood that the candidate domain is benign/non-malicious domain, prediction engine 174 determines (e.g., predicts) a domain classification based on such likelihood. For example, prediction engine 174 compares the likelihood that the candidate domain corresponds to a stockpiled domain to a likelihood threshold value. In response to a determination that the likelihood that the candidate domain corresponds to a stockpiled is greater than the likelihood threshold value, prediction engine 174 may deem (e.g., determine that) the candidate domain to correspond to a stockpiled domain.

According to various embodiments, in response to prediction engine 174 classifying the candidate domain, system 100 handles the traffic to/from the candidate domain according to a predefined policy (e.g., a security policy). For example, the system queries traffic handling policy 178 to determine the manner by which traffic to/from a domain matching the candidate domain is to be handled. Traffic handling policy 178 may be a predefined policy, such as a security policy, etc. Traffic handling policy 178 may indicate that traffic to/from certain domains is to be blocked and traffic to/from other domains is to be permitted to pass through the system (e.g., routed normally). Traffic handling policy 178 may correspond to a repository of a set of policies to be enforced with respect to network traffic. In some embodiments, security platform 140 receives one or more policies, such as from an administrator or third-party service, and provides the one or more policies to various network nodes, such as endpoints, security entities (e.g., inline firewalls), etc.

In response to determining a classification for a newly analyzed candidate domain, security platform 140 (e.g., domain classifier 170) sends an indication that domains matching the candidate domain are associated with, or otherwise correspond to, the determined classification. In the case that the determined classification for the candidate domain is that is a stockpiled domain, security platform 140 provides an indication that traffic to/from a domain matching the candidate domain (e.g., the same domain signature or same originating IP address, etc.) is also to be handled according to whether the candidate domain is a stockpiled domain. For example, security platform 140 determines (e.g., computes) a signature or identifier for the candidate domain (e.g., a hash or other signature), and sends to a network node (e.g., a security entity, an endpoint such as a client device, etc.) an indication of the classification associated with the signature (e.g., an indication whether the domain is a stockpiled domain, or an indication of whether the domain is a malicious/non-malicious domain, or an indication of whether traffic to/from the domain is malicious traffic). Security platform 140 may update a mapping of signatures to domain classifications and provide the updated mapping to the security entity. In some embodiments, security platform 140 further provides to the network node (e.g., security entity, client device, etc.) an indication of a manner by which traffic to a domain matching the signature is to be handled. For example, security platform 140 provides to the security entity a traffic handling policy, a security policy, or an update to a policy.

In some embodiments, system 100 (e.g., prediction engine 174 of network traffic classifier, an inline firewall or other inline security entity, etc.) determines whether information pertaining to a particular candidate domain (e.g., a newly received candidate domain to be analyzed) is comprised in a dataset of historical domains (e.g., historical network traffic, previously classified domains), whether a particular signature is associated with malicious traffic, or whether traffic corresponding to the candidate domain to be otherwise handled in a manner different than the normal traffic handling. The historical information may be provided by another system or module, such as a service running on security platform 140, or by a third-party service such as VirusTotal™, or both. In response to determining that information pertaining to a candidate domain is not comprised in, or available in, the dataset of historical domains (e.g., historical or previously analyzed domains), system 100 (e.g., domain classifier 170 or other inline security entity) may deem that the domain/traffic has not yet been analyzed and system 100 can invoke an analysis (e.g., a domain analysis) of the candidate domain (e.g., an analysis of the domain data for the candidate domain) in connection with determining (e.g., predicting) the domain classification (e.g., an inline security entity can query a classifier, such as domain classifier 170 that uses the header information for the domain or network traffic to query a machine learning model). The historical information (e.g., from a third-party service, a community-based score, etc.) indicates whether other vendors or cyber security organizations deem the particular traffic as malicious or should be handled in a certain manner.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

Stockpiled domain, for example, can be domains that are scams, phishing sites, or sites used to distribute C2 exploits or malware.

As an illustrative example, the environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious domains, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding domain (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. In other implementations, an inline security entity queries a mapping of hashes/signatures to traffic classifications (e.g., indications that the traffic is C2 traffic, indications that the traffic is malicious traffic, indications that the traffic is benign/non-malicious, etc.). This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may use a machine learning model to detect/predict whether the file is malicious) whether the queried file is a malicious file (or likely to be a malicious file) and provide a result back to data appliance 102 (e.g., "malicious file" or "benign file").

In some embodiments, security platform 140 comprises a network traffic classifier that provides to a security entity, such as data appliance 102, an indication of the traffic classification. For example, in response to detecting the C2 traffic, network traffic classifier sends an indication that the domain traffic corresponds to C2 traffic to data appliance 102, and the data appliance 102 may in turn enforce one or more policies (e.g., security policies) based at least in part on the indication. The one or more security policies may include isolating/quarantining the content (e.g., webpage content) for the domain, blocking access to the domain (e.g., blocking traffic for the domain), isolating/deleting the domain access request for the domain, ensuring that the domain is not resolved, alerting or prompting the user of the client device the maliciousness of the domain prior to the user viewing the webpage, blocking traffic to or from a particular node (e.g., a compromised device, such as a device that serves as a beacon in C2 communications), etc. As another example, in response to determining the application for the domain, the network traffic classifier provides to the security entity with an update of a mapping of signatures to applications (e.g., application identifiers).

Figure 2:
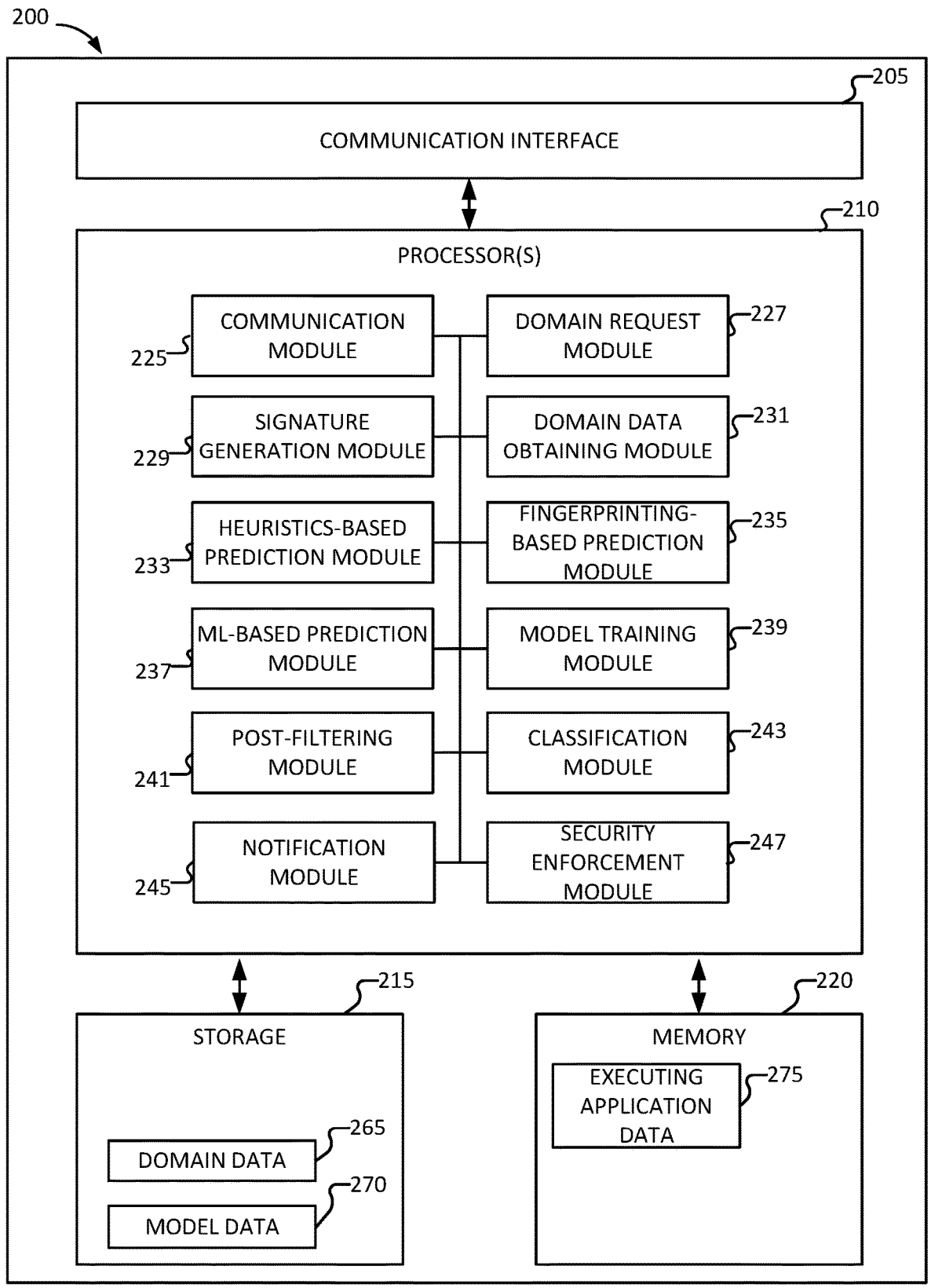
FIG. 2 is a block diagram of a system to detect a malicious domain according to various embodiments.

FIG. 2 is a block diagram of a system to detect a malicious domain according to various embodiments. According to various embodiments, system 200 is implemented in connection with system 100 of FIG. 1, such as for domain classifier 170. In various embodiments, system 200 is implemented in connection with process 400 of FIG. 4, process 500 of FIG. 6, process 600 of FIG. 6, process 700 of FIG. 7, process 800 of FIG. 8, and/or process 900 of FIG. 9. System 200 may be implemented in one or more servers, a security entity such as a firewall, and/or an endpoint.

System 200 can be implemented by one or more devices such as servers. System 200 can be implemented at various locations on a network. In some embodiments, system 200 implements domain classifier 170 of system 100 of FIG. 1. As an example, system 200 is deployed as a service, such as a web service (e.g., system 200 determines whether traffic corresponds to a particular domain, and provides such determinations as a service). The service may be provided by one or more servers. For example, system 200 or network traffic classifier is deployed on a remote server that monitors or receives network traffic that is transmitted within or into/out of a network and determines the traffic classification (e.g., whether the traffic is malicious traffic, such as traffic to/from a domain classified as a stockpiled domain, whether the traffic is non-malicious, such as traffic to/from a domain that is not classified as a stockpiled domain or that is classified as a benign domain, etc.) and sends/pushes out notifications or updates pertaining to the network traffic such as an indication of the domain to which the network traffic corresponds or an indication of whether an domain is stockpiled or otherwise malicious. As another example, the network traffic classifier is deployed on a firewall. In some embodiments, part of system 200 is implemented as a service (e.g., a cloud service provided by one or more remote servers) and another part of system 200 is implemented at a security entity or other network node such as a client device.

In some embodiments, system 200 is deployed on one or more servers and is configured to identify new domains and in response to detecting a new domain, classifying the domain (e.g., classifying the domain as stockpiled or non-stockpiled, etc.). For example, system 200 is configured to identify new domains at a predefined frequency. System 200 may poll domain registrations or certificates for domains to determine new domains. Accordingly, system 200 may detect stockpiled domains (e.g., classify domains as stockpiled) before the domains are maliciously deployed. In response to detecting the stockpiled domain, system 200 may implement an active measure, such as providing to another system (e.g., a firewall, an endpoint, an edge device, etc.) an indication that the domain corresponds to a malicious domain.

In some embodiments, system 200 receives network traffic and predicts a traffic classification (e.g., whether the traffic is malicious traffic or non-malicious traffic, such as based on a prediction of whether the traffic is to/from a stockpiled domain, etc.). System 200 can perform an active measure (or cause an active measure to be performed) in response to determining the traffic classification. For example, system 200 performs an active measure in response to determining that the traffic is malicious traffic (e.g., traffic to/from a malicious domain or a stockpiled domain). As another example, system 200 handles the traffic according to normal/benign traffic in response to determining that the traffic is not malicious traffic (e.g., traffic to/from a malicious domain or a stockpiled domain) or is otherwise not malicious traffic.

In the example shown, system 200 implements one or more modules in connection with predicting a domain classification, determining a likelihood that a domain is a stockpiled domain or otherwise a malicious domain, determining a likelihood that traffic to/from a particular domain is malicious traffic, etc. System 200 comprises communication interface 205, one or more processors 210, storage 215, and/or memory 220. One or more processors 210 comprises one or more of communication module 225, domain request module 227, signature generation module 229, domain data obtaining module 231, heuristics-based prediction module 233, fingerprinting-based prediction module 235, ML-based prediction module 237, model training module 239, post-filtering module 241, classification module 243, notification module 245, and security enforcement module 247.

In some embodiments, system 200 comprises communication module 225. System 200 uses communication module 225 to communicate with various nodes or end points (e.g., client terminals, firewalls, DNS resolvers, data appliances, other security entities, etc.), user systems such as an administrator system, and/or third-party services (e.g., a certificate authority service, a network/internet crawler or scanner, a pDNS service, and/or a registrar service provider, such as a WHOIS service, etc.) For example, communication module 225 provides to communication interface 205 information that is to be communicated (e.g., to another node, security entity, etc.). As another example, communication interface 205 provides to communication module 225 information received by system 200. Communication module 225 is configured to receive an indication of domains (e.g., candidate domains, network traffic, etc.) to be analyzed, such as from network endpoints or nodes such as security entities (e.g., firewalls), database systems, query systems, etc., or based on a periodic (e.g., according to a predefined frequency, etc.) polling of a service for an indication of newly registered domains. Communication module 225 is configured to query third party service(s) for information pertaining to the domain classifications (e.g., services that expose information/classifications for signatures/hashes of domains, registrants of domains, etc., such as third-party scores or assessments of maliciousness of a particular domain or a domain registrant, a community-based score, assessment, or reputation pertaining to domains or applications, a blacklist for domains, and/or a whitelist for domains, applications, or other certain types of network traffic, etc.). For example, system 200 uses communication module 225 to query the third-party service(s). Communication module 225 is further configured to receive one or more settings or configurations from an administrator. Examples of the one or more settings or configurations include configurations of a process determining whether a particular type of traffic (e.g., a particular HTTP request) is permitted, malicious, benign, etc., a format or process according to which a feature vector or embedding is to be determined, a set of feature vectors or embeddings to be provided to a classifier for determining the domain classification (e.g., for predicting whether a domain is stockpiled/non-stockpiled or malicious/non-malicious), a set of predefined signatures to be assessed or counted, information pertaining to a whitelist of domains, applications, nodes, or signatures for traffic (e.g., traffic that is not deemed suspicious or malicious), information pertaining to a blacklist of domains, applications, nodes, or signatures for traffic (e.g., traffic that is deemed to be suspicious or malicious and for which traffic is to be quarantined, deleted, or otherwise to be restricted from being executed/transmitted), etc.

In some embodiments, system 200 comprises domain request module 227. System 200 uses domain request module 227 to receive a request to classify a domain. System 200 may determine to a domain classification (e.g., determine/predict whether the domain is stockpiled/non-stockpiled or malicious/non-malicious) based at least in part on a request to navigate to a particular domain (e.g., an indication that a device, such as an edge device, is attempting to access the domain) or a request to predict whether domain is stockpiled or otherwise malicious (e.g., the request being received from an inline security device or edge device that is providing a security service or enforcing a security policy for the device attempting to access the domain. In some embodiments, the request to classify the domain is obtained in connection with a periodic analysis of newly detected domains. For example, system 200 (or another service) obtains an indication of new domains, such as according to a predefined time period/frequency. The indication of new domains may correspond to a set of newly registered domains (e.g., domains registered within a predefined period of time) or a set of domains for which a certificate was recently issued.

In some embodiments, system 200 comprises signature generation module 229. System 200 uses signature generation module 229 to obtain an identifier associated with the domain. The identifier may be the domain name, an IP address, and/or a signature generated based on the domain name or IP address. For example, signature generation module 229 performs a hash on the domain name or the IP address to obtain a signature corresponding to the domain. System 200 may use the identifier (e.g., the signature) in connection with querying a mapping of domains (or identifiers/signatures associated with the domains) to indications of whether the domains are stockpiled or otherwise malicious. For example, the mapping of domains to indications of whether the domains are stockpiled or otherwise malicious (e.g., a blacklist for malicious domains) may be used to quickly determine whether the domain has been previously analyzed and determined to be stockpiled or otherwise malicious. In response to determining that the domain is not included in the mapping, system 200 predicts a classification for the domain (e.g., the domain associated with the domain request received by domain request module 227). For example, the system determines the domain classification based on performing one or more of a heuristics-based prediction, a fingerprinting-based prediction, and/or a machine learning (ML)-based prediction.

In some embodiments, system 200 comprises domain data obtaining module 231. System 200 uses domain data obtaining module 231 to obtain domain data. As an example, system 200 obtains the domain data in response to querying mapping of domains (or domain identifiers/signatures) to indications of whether the domains are stockpiled or otherwise malicious, and determining that the mapping does not comprise the domain. In some embodiments, domain data obtaining module 231 obtains the domain data from one or more datasets (e.g., local storage, a remote database) and/or one or more third party services. Examples of domain data include certificate information pertaining to a certificate(s) associated with the candidate domain (e.g., the domain associated with the particular domain request), registration information, pDNS information, scan data, active DNS information, zone file information, etc.

Certification information may comprise one or more certificate(s) obtained from a certificate log or otherwise from a third-party service, such as a certificate authority or from internal scanning of the Internet (e.g., scan data). The certification information may further comprise information pertaining to the one or more certificates associated with the candidate domain. In some embodiments, the certificate information includes information about the validity period of the certificate for a certificate obtained from the certificate log. The certificate information may comprise self-signed certificates and/or certificate authority (CA)-signed certificates for the candidate domain. Domain data obtaining module 231 may obtain the certificate information by querying a certificate log.

In some embodiments, the system polls certificate log for newly registered/issued certificates. The system uses information from the certificate log to identify candidate domains to be classified. Generally, when a new certificate is issued, the certificate and/or corresponding information is logged in the certificate log. The certificate for a domain can be available before the certificate or domain is live. For example, the system polls the certificate log to capture an intent for a certificate/domain to go live. Accordingly, the system can use the polling of the certificate log for early detection of domains, which may be classified in connection with detecting stockpiled domains before the domain is live.

Registration information comprises information pertaining to the domain registration, including an indication of the individual or entity that registered the device. For example, the registration information comprises registrant data obtained from the WHOIS database/service, etc. Domain data obtaining module 231 may query a third-party service (e.g., the WHOIS database/service) for registration information associated with the candidate domain.

pDNS information includes information from pDNS logs pertaining to DNS queries and response logs from different vantage points. Domain data obtaining module 231 may query the pDNS logs to obtain pDNS information for the candidate domain.

Scan data includes information about devices and software obtained by probing a network for active ports, addresses, devices, and software. For example, the data may be obtained from the global Internet or an organization's public Internet address space. As an example, this is the type of service provided by the Xpanse service offered by Palo Alto Networks). The scan data may be obtained using custom scanning software, open source tools or commercial vulnerability scanners. Scanning is performed to identify assets/devices connected to a network or the internet. For example, the scanning system/service may identify a webserver associated with a candidate domain and determine the manufacturer, product, possibly version number, etc. As another example, the scanning system/service identifies threats or vulnerabilities on the network or device/asset connected to the network (e.g., the system identifies if malicious or vulnerable software is running on a particular system/asset). The scan data may include more detailed information pertaining to the IP address associated with the candidate domain, etc.

Scanning can be as simple as detecting open ports (e.g., port 80 is usually HTTP) and can also involve sending "payloads" (e.g., HTTP GET requests) and examining the responses. Such responses often allow the system to identify the type of software running (e.g., Apache, web frameworks, type of SSH software, etc.) as well as version numbers. In addition, for services running on SSL, the system obtains and stores certificates, which can be compared directly or used to generate features. Other information related to the scan is often available, such as the domain name that was used to initiate the scan. These are all useful for "Attack Surface Management" as well as feature generation and profiling specific devices, domains and IP addresses.

Active DNS information includes information pertaining to the domain, such as an indication of the records configured for the candidate domain. Domain data obtaining module 231 obtains the active DNA information from actively querying domain names to Examples of records that may be configured for the candidate domain include A, AAAA, NS, MX, CNAME records).

Zone file information may include zone files for a top-level domain. Some top-level domains make their zone files public for researchers. Domain data obtaining module 231 may determine whether a candidate domain exposes its zone files, and in response to determining that the candidate domain exposes zone files, domain data obtaining module 231 obtains the zone files exposed by the candidate domain. Additionally, or alternatively, domain data obtaining module 231 obtains a zone file for a top level domain (TLD). The zone file comprises a list of domains under that zone (e.g., all .com domains, etc.).

In some embodiments, system 200 comprises heuristics-based prediction module 233. System 200 uses heuristics-based prediction module 233 to predict a domain classification (e.g., predict whether a candidate domain is a stockpiled domain) based at least in part on one or more predefined heuristic rules. The one or more predefined heuristics rules are manually defined, such as by a subject matter expert. The predefined heuristic rule may precisely identify stockpiled or otherwise malicious domain names. An example of a heuristic rule includes a determination of a certificate that comprises a high proportion (e.g., greater than a predefined threshold) of stockpiled or otherwise malicious domains. Another example of a heuristic rule includes a determination that a certificate comprises a stockpiled or otherwise malicious domain (e.g., a number of malicious domains exceeding a predefined malicious domain count threshold) and does not comprise any benign domains.

In some embodiments, the one or more predefined heuristic rules include reputation-based heuristics. The reputation-based heuristics may be based on a reputation associated with the domain's certificate fields, pDNS data (e.g., IP addresses) or the registrant for the domain. The rules may be created to identify a set of domains for which a majority of the domains therein match known stockpiled or otherwise malicious domains and for which a known-benign domain is not included in the set of domains.

In some embodiments, the one or more predefined heuristic rules are created based at least in part on the information in the certificate for the candidate domain and/or pDNS information associated with the candidate domain (or the other domains in the certificate).

Examples of the one or more predefined heuristic rules include (a) deem the candidate domain to be stockpiled or otherwise malicious in response to a determination that a certificate associated with the candidate domain comprises a set of known malicious domains that constitute at least ninety percent of the domains comprised in the certificate and does not comprise any known (e.g., previously classified) benign domains, (b) deem the candidate domain to be stockpiled or otherwise malicious in response to a determination that the certificate for the candidate domain is created at a specific time window where at least ninety percent of the domains associated with the certificates are known malicious and the certificates do not comprise any known benign domains, (c) deem the candidate domain to be stockpiled or otherwise malicious in response to a determination that the certificate for the candidate domain shares the same public key and is hosted on the same DNS infrastructure where at least ninety percent of domains associated with the public key and/or DNS infrastructure are known malicious domains and where no known benign domains are associated with the public key and/or DNS infrastructure. Various other thresholds may be configured, such as to modify the sensitivity of the predefined heuristic rules.

In some embodiments, system 200 comprises fingerprinting-based prediction module 235. System 200 uses fingerprinting-based prediction module 235 to determine a domain classification (e.g., predict whether a candidate domain is a stockpiled domain) based on a determination of whether a fingerprint for the candidate domain matches a fingerprint for a known malicious domain. Fingerprinting-based prediction module 235 determines a fingerprint for the candidate domain and queries a mapping of fingerprints to malicious domains (e.g., known malicious domains) to determine whether the candidate domain fingerprint matches a fingerprint for a malicious domain. In some embodiments, the mapping of fingerprints to malicious domains is updated in response to a determination that a particular domain is malicious using a heuristics-based prediction or an ML-based prediction, or in response to an update to the mapping exposed/provided by a third-party service.

In some embodiments, the fingerprinting-based prediction of whether a candidate domain is a malicious domain (e.g., predict whether the candidate domain is a stockpiled domain) is based on a set of YARA rules for certificates belonging to known malicious campaigns. YARA rules may be used to classify and identify malicious domains by creating descriptions of malicious domains based on textual patterns, such as patterns for information in the certificate fields. The system detects a malicious/stockpiled domain based at least in part on obtaining one or more certificates for a candidate domain (e.g., from a certificate log), determining a candidate domain fingerprint, and using the YARA rules to determine whether the candidate domain certificate fingerprint matches a fingerprint(s) of known malicious certificates. For example, the system determines whether an expression in the candidate domain certificate matches a YARA rule associated with a malicious certificate (e.g., an expression deemed to be indicative of malicious certificates).

In some embodiments, fingerprinting-based prediction module 235 determines the YARA rules (e.g., the fingerprints associated with malicious domains) based at least in part on obtaining certificates for known malicious campaigns, such as TorrentLocker, IcedID, and Trickbot, etc. The system may obtain the certificates for known malicious campaigns from a third party service. For each group of certificates obtained for known malicious campaigns, fingerprinting-based prediction module 235 creates YARA rules based on the certificate fields (e.g., subject fields, issuer fields) that match all the certificates in the group but do not match those certificates for known benign domains. Fingerprinting-based prediction module 235 may iteratively refine the YARA rules to be succinct and generalizable to detect new certificates belonging to the same campaign but avoid matching any benign certificates.

In response to system 200 receiving a domain request, fingerprinting-based prediction module 235 obtains the certificate(s) for the candidate domain associated with the domain request, and uses a set of predefined YARA rules to determine whether at least one of the candidate domain certificate matches the YARA rules. In response to fingerprinting-based prediction module 235 detecting a stockpiled domain based on the YARA rules, system 200 deems the candidate domain as a stockpiled or otherwise malicious domain. System 200 may post-filter the predicted classification.

In some embodiments, system 200 comprises ML-based prediction module 237. System 200 uses ML-based prediction module 237 to determine a domain classification, such as to predict whether the candidate domain corresponds to a stockpiled domain and/or a malicious domain, predict whether the candidate domain is a benign domain, etc. ML-based prediction module 237 determines the domain classification (e.g., determines a prediction or likelihood that a candidate domain is a stockpiled or otherwise malicious domain) based on querying a classifier, such a machine learning model. In some embodiments, the classifier is a Random Forest model. Various other models according to other machine learning techniques may be implemented.

In some embodiments, ML-based prediction module 237 provides a scalable ML-based prediction technique to detect stockpiled domains. The classifier implemented by ML-based prediction module 237 is trained based on domain data, such as certificates (e.g., certificates for known malicious domains, certificates for known benign domains, etc.), registration information, pDNS information, scan data, active DNS information, zone file information, etc. In response to system 200 receiving a domain request, ML-based prediction module 237 obtain the domain data, generates one or more features based at least in part on the domain data, and queries the classifier (e.g., a model that provides a prediction of whether a domain is a stockpiled or otherwise malicious domain) based at least in part on the one or more features.

ML-based prediction module 237 may query the classifier and obtain an indication of a likelihood that the candidate domain corresponds to a stockpiled domain. ML-based prediction module 237 may determine that the candidate domain corresponds to a stockpiled domain in response to determining the likelihood that the domain corresponds to a stockpiled domain obtained based on querying the classifier exceeds a predefined stockpiled domain likelihood threshold.

According to various embodiments, ML-based prediction module 237 implements a classifier (e.g., a machine learning model) to classify the candidate domain based on collected domain data for the sampled domain. System 200 may train the classifier, or system 200 may obtain the classifier from a service. The classifier is trained based at least in part on a machine learning process. Examples of machine learning algorithms that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a neural network (NN), etc. The classifier provides a predicted classification (e.g., a machine learning-based predicted classification), such as a prediction of whether a candidate domain is a stockpiled domain.

Figure 3:
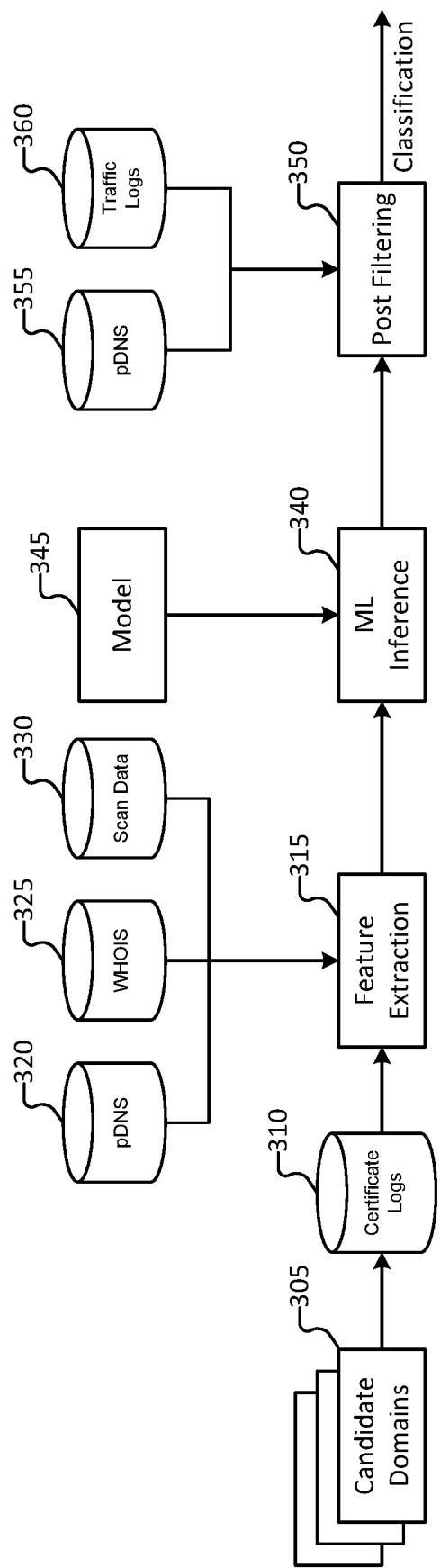
FIG. 3 is an illustration of a system for detecting a malicious domain according to various embodiments.

In some embodiments, ML-based prediction module 237 is implemented at least in part by system 300 of FIG. 3.

In some embodiments, system 200 comprises model training module 239. System 200 uses model training module 239 to train the machine learning model used to perform domain classification (e.g., to predict whether a candidate domain corresponds to a stockpiled domain).

In some embodiments, system 200 comprises post-filtering module 241. System 200 uses post-filtering module 241 to filter predicted domain classifications. The post filtering of domain classifications may be optional. Because the classifier does not have perfect accuracy and the data the classifier encounters (e.g., the domain data) after deployment (e.g., in production) can have a significantly different distribution compared to the training data (e.g., the labeled data used to train the classifier), post-filtering is performed to remove potential false positives (e.g., false classifications that a particular domain is a stockpiled domain).

In some embodiments, post-filtering module 241 obtains domain data, such as customer traffic logs and pDNS records. Post-filtering module 241 uses such domain data to specifically identify domains that exhibit patterns that are not consistent with stockpiled domains or for which a domain classification is expected to result in a false positive that can significantly impact devices (e.g., devices of customers of the stockpiled domain detection service). For example, system 200 may deem stable and popular domains as unlikely to be stockpiled or malicious.

In some embodiments, system 200 comprises classification module 243. System 200 uses classification module 243 to determine a domain classification based at least in part on one or more of the fingerprinting-based domain classification, the heuristics-based domain classification, and/or the ML-based prediction classification. For example, system 200 deems a candidate domain to be a stockpiled domain (or a malicious domain) if any one of a fingerprinting-based domain classification, the heuristics-based domain classification, and a ML-based prediction classification (e.g., a post-filtered ML-based prediction classification) indicates that the candidate domain is a stockpiled or otherwise malicious domain.

In some embodiments, system 200 comprises notification module 245. System 200 uses notification module 245 to provide an indication of the domain classification, such as an indication whether the candidate domain is malicious, an indication whether the candidate domain is a stockpiled domain and/or a likelihood of whether the domain is a stockpiled domain, etc. In some embodiments, system 200 additionally classifies the domain as malicious/benign and notification module 245 provides an indication of whether the candidate domain is benign, an indication of a likelihood of whether the domain is malicious/benign, etc. Notification module 245 provides the indication (e.g., the report) to another system or service, such as inline security or other security entity requesting the domain classification or otherwise handling traffic, or an administrator system (e.g., used by a network administrator while evaluating a security policy posture, etc.), etc. Notification module 245 may also provide an indication of an active measure to be implemented or a recommendation for an active measure to be implemented (e.g., a recommendation for handling the traffic to/from the candidate domain based on the domain classification, etc.).

System 200 may use notification module 245 to provide to one or more security entities (e.g., a firewall), nodes, or endpoints (e.g., a client terminal) an update to a whitelist of domains, such as a whitelist of IP addresses (e.g., IP addresses from which HTTP requests originate) or a whitelist of domain signatures (e.g., hashes for domains deemed to be benign). System 200 may use the whitelist to classify candidate domains that are associated with a domain request for domain classification. According to various embodiments, obtains a hash, signature, or other unique identifier associated with the candidate domain (e.g., a webpage for the domain), and provides an indication to the requesting entity (e.g., the security entity, node, or endpoint requesting the domain classification) an indication of domain classification for the requesting entity to handle traffic to/from the domain (e.g., enforces a security policy) for candidate domains deemed to be stockpiled or otherwise malicious domains based at least in part on the hash, signature, or other unique identifier associated with the candidate domain.

System 200 may use notification module 245 to provide to one or more security entities (e.g., a firewall), nodes, or endpoints (e.g., a client terminal) an update to a blacklist of domains for domains classified as stockpiled or otherwise malicious domains. For example, system 200 provides a blacklist of IP addresses (e.g., IP addresses from which HTTP requests originate) or a blacklist of domain signatures (e.g., hashes for domains deemed to be stockpiled or otherwise malicious).

According to various embodiments, the hash of a candidate domain corresponds to a hash of an IP address (e.g., the IP address from which the HTTP request originates), a hash of the webpage provided at the candidate domain, etc. A security entity or an endpoint may compute a hash of a candidate domain being monitored/analyzed (e.g., a domain from/to which traffic is communicated). The security entity or an endpoint may determine whether the computed hash corresponding to the candidate domain is comprised within a set such as a whitelist of benign domains, and/or a blacklist of domains, etc. Additionally, or alternatively, the security entity can determine whether a whitelist of domains or a blacklist of domains comprises the candidate domain. If a signature for a received candidate domain is included in the set of signatures for domains previously deemed stockpiled or otherwise malicious (e.g., a blacklist of domains), the security entity or an endpoint can prevent the transmission of the corresponding traffic or prevent traffic to/from the domain, or otherwise enforce a security policy.

In some embodiments, system 200 comprises security enforcement module 247. System 200 uses security enforcement module 247 to enforce one or more security policies with respect to information such as network traffic, files, etc. System 200 may use security enforcement module 247 to perform an active measure with respect to the network traffic in response to detecting that the domain associated with the traffic is malicious or otherwise deemed to be a stockpiled domain. Security enforcement module 247 enforces the one or more security policies based on whether the candidate domain is determined to be stockpiled or otherwise malicious. As an example, in the case of system 200 being a security entity (e.g., a firewall) or firewall, system 200 comprises security enforcement module 247. Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, and/or other file transfers.

According to various embodiments, storage 215 comprises one or more of domain data 265, and/or model data 270. Storage 215 comprises a shared storage (e.g., a network storage system) and/or database data, and/or user activity data.

Domain data 265 comprises information pertaining to one or more domains. For example, domain data 265 comprises the domain data for the domain being analyzed/classified (e.g., the candidate domain associated with the domain request received by domain request module 227). In some embodiments, domain data 265 comprises pDNS data for domains (e.g., a candidate domain), Whois data for domains, scan data for domains, etc.

Domain data 265 may further comprise information pertaining to a predicted domain classifications for domains, such as predictions of whether the candidate domain is a stockpiled domain. For example, domain data 265 stores an indication that the domain is a stockpiled domain, an indication of a likelihood that the domain is a stockpiled domain, an indication of a likelihood that the domain is benign/non-malicious domain (e.g., a non-stockpiled domain), etc.

Model data 270 comprises information pertaining to one or more models used to predict domain classification, or to predict a likelihood that a domain corresponds to a stockpiled domain or a likelihood that the domain corresponds to a stockpiled or otherwise malicious domain. As an example, model data 270 stores the classifier (e.g., a Random Forest machine learning model(s) such as a detection model) used in connection with classifying domains.

According to various embodiments, memory 220 comprises executing application data 275. Executing application data 275 comprises data obtained or used in connection with executing an application such as an application executing a hashing function, an application to extract information from webpage content, an application to collect domain data, an application to monitor certificate logs, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, suspicious files, an application for detecting suspicious or stockpiled domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

FIG. 3 is an illustration of a system for detecting a malicious domain according to various embodiments. In some embodiments, system 300 is implemented at least in part by system 100 of FIG. 1 and/or system 200 of FIG. 2. In some embodiments, system 300 implements at least part of process 400 of FIG. 4, process 500 of FIG. 5, process 600 of FIG. 6, process 700 of FIG. 8, and/or process 900 of FIG. 9. In some embodiments, system 300 is implemented to train a classifier (e.g., a machine learning model) to perform an ML-based domain classification.

The ML-based detection pipeline (e.g., the forming of stockpiled domain detection) includes three main stages: (a) a data processing stage, (b) a classification stage, and (c) a post-filtering stage.

At the data processing stage, system 300 collects information about domain names. For example, system 300 queries/polls certificate logs 310 (e.g., a certificate transparency log) for an indication of a set of domains, such as a set of domains for which certificate is newly issued/registered. System 300 determines domain names included in the certificate transparency logs, and collects domain data for the domains obtained from the certificate transparency logs. System 300 obtains the domain data from a variety of sources, including certificate logs (e.g., the certificate transparency logs), a pDNS database (e.g., a pDNS service), a WHOIS database, a scan data database, an active DNS database, and zone files.

Collecting the domain data may include obtaining a certificate(s) for the domains and/or other domain data. System 300 may collect the domain data from one or more data sources, such as a local datasets comprising certificate information, registration/registrant information, etc. Additionally, or alternatively, system 300 collects domain data by querying one or more third party services, such as a WHOIS database for registrant information. In the example shown, system 300 obtains the domain data from pDNS database 320 (e.g., a third-party pDNS service), WHOIS database 325, and scan data database 330. The scan data may be obtained by scanning and discovering all devices connected to a network or the internet.

In some embodiments, system 300 collects and parses certificates from certificate log streams, such as from certificate logs 310. System 300 may additionally collect certificates from scan data that might not be present in certificate logs 310. The certificates collected from the certificate log and/or scan data database provide the basis for the feature extraction pipeline. System also leverages external systems that collect and store the following: DNS traffic logs (passive DNS), domain registration information (WHOIS), scan data about IP addresses, labeled data, and TLD reputation.

The TLD reputation is calculated leveraging several sources of known benign and malicious domain names. In some implementations, the TLD reputation is assessed and provided by a third-party service. For accurate reputation scores, system 300 distinguishes active domains from NX domains leveraging additional data sources such as active DNS, zone files, and passive DNS.

System 300 may obtain benign labeled data from lists of known popular domains, customer domains, and domains popular in customer DNS or web traffic. Malicious labeled data may be obtained from other detectors and third-party sources.

In some embodiments, system 300 obtains domain data on an ad hoc basis when a domain classification is to be performed (e.g., contemporaneous with the domain classification) for a particular domain(s), or system 300 periodically polls the various data sources to obtain domain data to be used during domain classifications.

In the example shown, one or more domains (e.g., candidate domains 305) are discovered in certificate logs 310 (e.g., a certificate transparency log(s)). For example, domains are found in certificate(s) issued/registered for the one or more domains. System 300 may be configured to periodically poll certificate logs 310 to determine newly logged domains (e.g., domains for which a certificate is newly issued/registered). For example, system 300 polls certificate logs 310 according to a predetermined polling frequency (e.g., daily, weekly, monthly, etc.). As another example, system 300 obtains certificate data in a stream of data from certificate logs 310. System 300 may process certificates obtained in the stream of data in batches according to a predefined frequency (e.g., daily, weekly, etc.).

In response to obtaining a set of domain(s) (e.g., one or more new domains) from certificate logs 310, system 300 obtains certificates for the set of domains and other domain data from other domain data sources, such as pDNS database 320, WHOIS database 325, and scan data database 330.

In response to obtaining the domain data, system 300 performs feature extraction at 315. System 300 obtains data for one or more features associated with domain data that is used to predict whether the corresponding domain(s) is a stockpiled or otherwise malicious domain.

In some embodiments, the feature extraction process includes calculating features and fields for individual certificates obtained from certificate logs 310. Because a domain can have many certificates, the most recent certificate for the domain is used to determine the per-certificate features. Alternatively, or additionally, system 300 uses other aggregation methods for the plurality of certificates associated with a candidate domain, such as average, min, max, median, etc. The feature extraction may also include calculating per domain certificate features. Additionally, or alternatively, the feature extraction includes extracting the domains to be analyzed and collecting other per domain features such as lexical features, TLD reputation features, and WHOIS features. Each of the different types of features (e.g., per domain certificate, lexical, TLD reputation, WHOIS, etc.) are further described below.

In some embodiments, after system 300 extracts per-certificate and per-domain features during the feature extraction process, system 300 performs an aggregation on certificate fields and passive DNS data (e.g., IP or /24 subnet data) to determine (e.g., calculate) aggregate and reputation features. The aggregate and reputation features may be indicative of whether the setup (e.g., certificate or infrastructure) of a domain exhibits behavior consistent with a campaign using multiple malicious domain names.

In some embodiments, after system 300 performs pDNS aggregation during the feature extraction process, system 300 extracts domain-IP pairs that can be used to query the scan database for IP address-related features.

In some embodiments, in connection with performing feature extraction, system 300 calculates aggregation features across certificate and pDNS data at the same time by joining these large datasets.

In response to obtaining the features for the domain data associated with the candidate domain at 315, system 300 performs a machine learning (ML) inference at 340. Performing the ML inference includes querying a classifier, such as model 345. System 300 queries model 345 based at least in part on the features extracted from the domain data for the candidate domain. In some embodiments, the obtained ML inference corresponds to an ML-based prediction (e.g., an ML-based domain classification).

In some embodiments, system 300 performs a post-filtering operation on the ML-based prediction or the set of domain classifications comprising the heuristics-based classification, the fingerprinting-based classification, and the ML-based classification. System 300 may optionally perform the post-filtering operation, such as based on a particular classification returned from the ML inference, etc.

In the example shown, in response to obtaining the ML inference at 340, system 300 performs a post-filtering operation at 350. The post-filtering operation may be performed in connection with improving the accuracy of the domain classification. For example, because a classifier does not have perfect accuracy and the data the classifier (e.g., the ML model) encounters in production can have a significantly different distribution compared to the labeled data, system 300 post-filters the domain classification.

In some embodiments, the post-filtering operation includes collecting data from pDNS records 355 and traffic logs 360 (e.g., customer traffic logs obtained by one or more security entities within an organization's network). The traffic logs and pDNS records are used to specifically look for domains that exhibit patterns that are not consistent with stockpiled or otherwise malicious domains or would result in a false positive significantly impacting customers. For example, stable and popular domains are not likely to be stockpiled or otherwise malicious, but if the classifier falsely classifies such domains as stockpiled or otherwise malicious, such as classification could significantly affect customers' operations (e.g., because traffic to/from the domain may be handled according to a predefined security policy).

In response to performing the post-filtering operation, system 300 may return a domain classification. For example, system 300 returns an indication of whether the candidate domain is stockpiled or otherwise malicious.

In some embodiments, system 300 trains a classifier (e.g., model 345) that is configured to predict a domain classification (e.g., to predict whether a candidate domain is a stockpiled domain). To train the classifier, system 300 collects both examples of malicious and benign domains. For example, system 300 obtains domain data for a set of malicious domains (e.g., known malicious domains) and domain data for a set of benign domains (e.g., known benign domains). The obtained domain data is used as a training set. For the set of malicious domains (e.g., a malicious labeled dataset), system 300 uses domains from other malicious traffic/domain detectors (e.g., from classifications made by a security platform or application running in-line on a firewall) and third-party intelligence sources (e.g., third-party services). For the set of benign domains (e.g., benign labeled dataset) system 300 uses lists of popular domains and known benign domain names. As an example, the labeled dataset has millions of candidate domains for each of the set of benign domains and the set of malicious domains.

After collecting the labeled data (e.g., the domain data for a set of malicious domains and a set of benign domains), system 300 splits the labeled data into reputation, training and test datasets. As an example, system 300 randomly collects 100,000 malicious and 100,000 benign domains for the train dataset, 10,000 malicious and 10,000 benign for the test dataset and system 300 uses the rest of the millions of domains for the reputation features. System 300 is configured to ensure there is no overlap between the reputation, training, and test datasets.

In some embodiments, system 300 alternatively splits the labeled data based on the date when a domain first appeared in the malicious or benign datasets. For example, a one-year time window (or other predefined time period) for reputation, the following one month for training, and the following week of data for testing. This process for splitting the labeled data ensures that the classifier can detect new campaigns and domains.

After system 300 has calculated the features and has obtained the training and testing labeled datasets, system 300 trains a classifier (e.g., a classifier to detect malicious domains and/or stockpiled domains). System 300 trains the classifier based on implementing a machine learning technique. For example, the machine learning process may include neural networks, Random Forest, XGBoost, or other supervised classifiers. Various other machine learning techniques may be implemented.

In some embodiments, the classifier is trained with Random Forest with a limited number of features and maximum depth. The depth of trees and the number of features used may be limited in order to avoid overfitting and to improve the generalizability of the model/classifier.

Many features may be extracted from the domain data. Further, many of the possible features are correlated. In some embodiments, system 300 performs feature selection from among the set of possible features to use the top features that are most useful for the machine learning classifier to perform well (e.g., a set of features for the classifier to perform according to a predefined metric(s), such as a minimum detection of new stockpiled or otherwise malicious domains or a maximum false positive rate, etc.). Decreasing the number of features used to train a classifier can help improve computational performance and utilize those features more effectively.

In some embodiments, system 300 performs the feature selection (e.g., to select the top/best features for training the classifier) based on using ANOVA F-value analysis technique, or other Chi-squared techniques. Because many of the sets of possible features are highly correlated with each other, system 300 calculates the mutual pearson correlation between all features (or a selected set of features). Initially, system 300 may consider all features in the set of possible features as candidate features. Using the ANOVA F-value, system 300 selects the best feature and decreases the rating of the other features based on how correlated the other features are with the selected best feature (e.g., as determined based on the mutual pearson correlation). We add the best feature to our list of selected features and remove it from the candidate feature list. We iteratively select features from the candidate list until we get the desired number of features. This is a necessary step as the more correlated a feature is to a previously selected feature, the less useful it would be to select it as an additional feature to use.

An alternative technique for performing feature selection is using a Principal Component Analysis (PCA) process. In some embodiments, system 300 uses the PCA process to reduce the number of features used in training the classifier and/or querying the classifier for a predicted domain classification. PCA is a dimensionality reduction algorithm that results in a small number of very useful features that explain most of the variation in the corresponding data (e.g., the domain data). However, the PCA technique may create new features that are harder to interpret than the features generated according to the ANOVA F-value or Chi-squared statistics.

System 300 may be configured to select classifiers with different performance and complexity tradeoffs based on the desired use case for the classifier. According to some simulated experiments, the best performing classifier achieves 0.99 precision and 0.48 recall using the 128 best features and allowing each of 400 trees in the random forest to use at most 32 features and to have a maximum depth of 16. To achieve this performance, the precision on the training set is configured really high because finding generic stockpiled domains without false positives (FPs) is challenging. A value of 0.48 for recall is great considering that many of the malicious domains might not be stockpiled or that do not leave traces of information in the datasets used (e.g., the domain data used to generate a predicted domain classification).

In some embodiments, system 300 aggregates IP, certificate, etc. features to create per-domain-level features. The aggregation may be implemented by either using the latest association (e.g., latest certificate or IP associated with the candidate domain) or by calculating statistics such as min, max, median, average, Jeffrey Divergence (JD), etc.

Reputation Based Features

In some embodiments, system 300 determines a predicted domain classification based at least in part on reputation-based features. System 300 may use reputation-based features to calculate TLD, certificate and pDNS based features that are used in determining a predicted domain classification. Examples of reputation-based features are provided below.

According to various embodiments, some features listed might not be used by themselves but further used and processed when calculating aggregate and reputation features.

| Feature Name | Description |
| --- | --- |
| Total count log10 | The total number of domains in log 10 scale |
| Malicious countlog10 and proportion | The total number of malicious domains in log 10 scale and the proportion in comparison to the total |
| Malware count log10 and proportion | The total number of malware domains in log 10 scale and the proportion in comparison to the total |
| Phishing count log10 and proportion | The total number of phishing domains in log 10 scale and the proportion in comparison to the total |
| C2 count log10 and proportion | The total number of c2 domains in log 10 scale and the proportion in comparison to the total. C2 stands for command and control domains. |
| Grayware count log10 and proportion | The total number of grayware domains in log 10 scale and the proportion in comparison to the total |
| Low-quality count log10 and proportion | The total number of low-quality domains in log 10 scale and the proportion in comparison to the total |
| Benign count log10 and proportion | The total number of benign domains in log 10 scale and the proportion in comparison to the total |
| Malicious/(Malicious + Benign) | Ratio of malicious compared to malicious plus benign. It is similar to the malicious proportion but does not include unknown domains. This can also be calculated for phishing/c2/grayware/low-quality/etc. |

Domain Name Lexical and TLD Reputation Features

According to various embodiments, some features listed might not be used by themselves but further used and processed when calculating aggregate and reputation features.

In some embodiments, system 300 determines a predicted domain classification based at least in part on domain name lexical features and/or TLD reputation-based features. TLD reputation features can comprise reputation-based features described above which are specifically calculated for the TLD of the domain name (e.g., .com or .xyz).

In some embodiments, system 300 uses a stochastic model to determine if a domain name is randomly generated. For example, system 300 can build a stochastic model from natural language (e.g., text from the Internet) and use the stochastic model to determine whether a domain name is random. For example, a stochastic model can be a list or probabilities of how likely a character is to come after another character in natural language text. Multiplying these probabilities for all neighboring character pairs in a domain name describes how similar the domain is to the natural text used. If the probability is low (e.g., less than a predefined probability threshold) then the domain is deemed to likely be random. An example of such a stochastic model is called a Markov Chain model. A Markov Chain has many variants to calculate probabilities (e.g., using different n-grams at the same time).

System 300 can find words in domain name strings based on searching for all possible combinations of words from a dictionary (e.g., a predefined dictionary). Because multiple combinations of words are possible, system 300 can implement a cost function and choose the combination of words corresponding to the lowest cost (e.g., according to the cost function). One example implementation for selecting the combination of words comprised in the domain name string is Word Ninja (e.g., available at https://github.com/keredson/wordninja), which uses relative word frequencies as the bases of its cost function and dynamic programming to efficiently find substring with the lowest possible cost. The Word Ninja algorithm runs in linear time (O(n)) compared to the length of the domain string.

Examples of domain name lexical features and TLD reputation-based features are provided below.

| Feature Name | Description |
| --- | --- |
| Domain Length | The length of the domain |
| Number of dashes | The number of "-"s in the domain name |
| Number of digits | The number of digits in the domain name |
| Proportion of dashes | The proportion of dashes compared to all the characters in the domain name |
| Proportion of digits | The proportion of digits compared to all the characters in the domain name |
| Brand encoded | The brand in a domain name encoded |
| Number of brands | The number of unique popular brands included in the domain name |
| Brand position min | The position of the first occurrence of a popular brand name in the domain name |
| TLD encoded | Top level domain code, where each TLD is encoded into a unique integer. |
| Number of words | Number of words in the domain name. |
| Entropy Markov | Markov entropy of the domain. Explained at the beginning of this section. |
| List of words | The list of distinct words in the domain name |
| Entropy shannon | The Shannon entropy of the domain |
| Number of fake TLDs | Number of fake TLDs embedded in the domain name. Such as strings like "-tld". This feature can indicate malice as some domains might try to trick users: google-com.com The compilation of the most common fake TLDs observed in malicious domains |
| List of fake TLDs | The list of fake TLDs embedded in the domain name |
| Is it an IDN? | Is the domain an internationalized domain name? |
| Number of suspicious keywords | Number of suspicious keywords such as login, securie, authenticate, etc. |
| Number of similar keywords | Number of keywords similar to suspicious keywords. The similarity is measured by a string similarity method such as Levenshtein distance |
| Is a squatting domain | Is the domain impersonating a known brand? Encoded by the type of squatting: 0: no squatting 1: typosquatting - go0gle.com 2: combosquatting - secure-google-page.hu 3: levelsquatting: google.com.askdk23nrj.ph 4: soundsquatting: oober.com |

WHOIS Features

In some embodiments, system 300 determines a predicted domain classification based at least in part on WHOIS features. Examples of WHOIS features are provided below.

According to various embodiments, some features listed might not be used by themselves but further used and processed when calculating aggregate and reputation features.

| Feature Name | Description |
| --- | --- |
| WHOIS duration | The duration of the domain from the registered date to the expiration date. The longer a domain's duration is the more likely it is a benign domain. |

| Feature Name | Description |
| --- | --- |
| Number of days to expiration | The number of days from the classification date to expire. Benign domains are likely to renew domains early as a good security practice. |
| WHOIS age | The number of days elapsed since the domain was registered. Newly registered domains are more likely to be involved in malicious activities. |
| Registrar name | The name of the domain registrar integer encoded. Malicious domains are more likely to register their domains under registrars with low reputation. |
| Registrar reputation | Similar to TLD reputation. The compilation of reputation scores based on known malicious domains detected by a security platform and third-party sources. This feature can be similar to TLD reputation; multiple such features may be computed. |
| Privacy protected state | Is the domain privacy protected? Malicious domains are more likely to use privacy protection services in order to hide their identity. |
| Updated state | Is the domain record updated shortly after it was registered? The status of the malicious domains is likely to be updated sooner than that of benign domains. |

Certificate Features

In some embodiments, system 300 determines a predicted domain classification based at least in part on certificate features. Examples of certificate features are provided below.

According to various embodiments, some features listed might not be used by themselves but further used and processed when calculating aggregate and reputation features.

| Feature Name | Description |
| --- | --- |
| Domain name count | The number of domains in the subject alternative name and common name fields |
| Root domain count | The number of root domains in the subject alternative name and common name field |
| Not before time sec | The start time of the certificate's validity in seconds |
| Not after time sec | The end time of the certificate's validity in seconds. |
| Seen time microsec | When the certificate was seen in CT logs in microsec. |
| Seen time millisec | When the certificate was seen in CT logs in millisec |
| Seen time sec | When the certificate was seen in CT logs in sec. |
| Validity length | The validity period of the certificate. "Not after-not before" |
| Not after + not before | Addition of not after and not before times |
| Seen time − not before | Difference of seen time and not before time |
| Not after − seen time | Difference of not after time and seen time |
| Issuer aggregated | Aggregated information about the issuer of the certificate. |
| Subject aggregated | Aggregated information about the subject of the certificate. |
| SCT | Signed certificate timestamp |
| Fingerprint | Fingerprint of the certificate uniquely identifying the certificate. |
| Is wild card? | Is the certificate issued to a wild card domain? |
| Number of wild card domains | Number of wild card domains in the certificate |
| Certificate type | The type of the certificate: DV (Domain Validated), OV (Organization Valiate) or EV (Extended Validated) |

Certificate Domain Aggregation Features

In some embodiments, system 300 determines a predicted domain classification based at least in part on certificate domain aggregation features.

Examples of certificate domain aggregation features are provided below.

| Feature Name | Description |
| --- | --- |
| Not before count | The number of distinct not before fields values in the certificates of the domain during the past t time window (e.g., 6 months) |
| Not after count | The number of distinct not after fields values in the certificates of the domain during the past t time window (e.g., 6 months) |
| Validity length count | The unique count of different validity lengths of all the certificates of the domain during the past t time window (e.g., 6 months) |
| Fingerprint count | The number of distinct fingerprints in the certificates of the domain during the past t time window (e.g., 6 months) |
| Issuer aggregated count | The number of distinct issuers in the certificates of the domain during the past t time window (e.g., 6 months) |
| Subject aggregated count | The number of distinct subjects in the certificates of the domain during the past t time window (e.g., 6 months) |
| SCT count | The number of distinct SCTs in the certificates of the domain during the past t time window (e.g., 6 months) |
| Subject organization count | The number of distinct subject organizations mentioned in the subject field of the certificates of the domain during the past t time window (e.g., 6 months) |

Certificate Reputation and Aggregation Features

In some embodiments, system 300 determines a predicted domain classification based at least in part on certificate reputation and aggregation features. System 300 can determine (e.g., calculate) certificate reputation and aggregation features for certain fields or derived fields that are calculated from such certificate fields. The aggregation features may be computed based on one or more of the domain name lexical and TLD reputation features, WHOIS features, reputation features, etc.

As an example, in the case of validity length, system 300 obtains all certificates with a given validity length and calculates the number of malicious domains divided by the total number of domains in those certificates. Various other features can be calculated, such as the total malicious count, average Markov entropy of domain names, Jeffrey divergence of brands in the domain names, etc.

In some embodiments, system 300 computes all possible computations of field feature pairs.

Because the domain may be included in a plurality of certificates, system 300 may use the latest certificate for the domain to compute features for the per-domain features. Additionally, system 300 may compute the min, max, median, average, or other statistical characteristic from the plurality of certificates associated with a domain name (e.g., all certificates that include the particular domain).

According to various embodiments, some features listed might not be used by themselves but further used and processed when calculating aggregate and reputation features.

Examples of certificate reputation and aggregation features are provided below.

| Feature Name | Description |
| --- | --- |
| Validity length Malicious proportion | If certificates with a certain validity length have a high proportion of malicious domains would signal that this value for the certificate field is specific to some automated malicious activity. |
| Seen time millisec Markov entropy average | If certificates appearing at a certain time have many random domains (high average entropy) would signal that this value for the certificate field is specific to some automated activity. |
| Fingerprint Word count | If certain certificates have some specific word counts for their domains could signal automation. |
| Fingerprint Word count JD | Too even distribution of word counts for domains in a certificate would signal automation. |
| SCT Number of unique words | Indicative of registration via automation |
| Not after − seen time Domain length JD | If all domains have similar length for this field would signal some kind of automation |
| Subject aggregated Brand proportion | If domains have a lot of brand names in them could be a signal that it is a malicious campaign targeting a brand or multiple brands. |
| Issuer aggregated Malicious proportion | If certificates with a certain issuer aggregated value have a high proportion of malicious domains would signal that this value for the certificate field is specific to some automated malicious activity | pDNS Reputation and Aggregation Features

In some embodiments, system 300 determines a predicted domain classification based at least in part on pDNS reputation features. System 300 can determine (e.g., calculate) pDNS reputation and aggregation features in a similar manner to the determination of certificate reputation and aggregation features.

In some embodiments, in connection with computing the pDNS reputation features, system 300 retrieves the IP addresses to which the domains from certificates have resolved. System 300 then retrieves the domain names (e.g., all the domain names) using the retrieved IP addresses. System 300 then groups pDNS data based at least in part on (e.g., using) the retrieved IP addresses or the /24 subnets of such IP addresses.

In some instances, a large number of domains use an IP address and computing JD-based features would be too computationally expensive for all IP addresses. However, JD-based features are not expected to change significantly if a large enough uniform sample is used. Thus, in some embodiments, system 300 randomly samples the domains that use the IP address in connection with computing JD-based features.

Additionally, system 300 may determine per-domain pDNS features based at least in part on computing the min, max, median, average, or other statistical characteristic for a set of IP addresses (e.g., all IP addresses) to which a domain has resolved.

According to various embodiments, some features listed might not be used by themselves but further used and processed when calculating aggregate and reputation features.

Examples of pDNS aggregation features are provided below.

| Feature Name | Description |
| --- | --- |
| Domain pDNS age | The duration from the first seen record to the last seen record in pDNS |
| Domain pDNS total count | The number of times the domain is queried |
| Domain pDNS unique IP count | The number of Ips on which the domain is hosted |
| Domain pDNS unique /24 subnet count | The number of /24 subnets on which the domain is hosted |

In some embodiments, system 300 determines a predicted domain classification based at least in part on pDNS aggregated features. System 300 determines (e.g., calculates all the combinations of fields (e.g., IP addresses and /24 subnet) and reputation-based features, domain name lexical and TLD reputation features, WHOIS features, and/or certificate domain aggregation features.

In some embodiments, system 300 computes all possible computations of IP or /24 subnet feature pairs.

Examples of pDNS aggregated features are provided below.

| Feature Name | Description |
| --- | --- |
| IP malicious root proportion min | The minimum proportion of malicious domains in the hosting Ips |
| IP malicious root proportion median | The median proportion of malicious domains in the hosting IPs |
| IP certificate root proportion min | The minimum proportion of certificate root domains in hosting IPs |
| IP certificate fingerprint count average | The average number of certificate fingerprint in hosting IPs |
| /24 subnet malicious root proportion max | The median proportion of malicious domains in the hosting subnet /24 |
| /24 subnet certificate validity JD min | The minimum JD of certificate validity in the hosting subnet /24 |
| /24 domain pDNS age JD | JD of the pDNS domain age in the hosting subnet /24 |
| /24 domain WHOIS age max | The maximum age of the domain in the hosting subnet /24 |

Scan Data Features

In some embodiments, system 300 determines a predicted domain classification based at least in part on certificate reputation and aggregation features. Scan data features may be per-IP address features. Because a domain name may have a plurality of associated IP addresses, system 300 may determine (e.g., calculate) the sum, average, median, minimum, and maximum of these features.

Examples of scan data features are provided below.

| Feature Name | Description |
| --- | --- |
| Most common port(s) | List the N most common ports (e.g., are they all listening on ports 443, 22, and 9000) |
| % of occurrences for most common ports | e.g., ports 443 and 22 account for most of the open ports |
| Distinct Port count, avg, std | A measure of the total number of ports observed on an IP address. |
| Distinct system port count, avg, std | How many distinct system ports (0-1023) were observed? |
| Distinct registered port count, avg, std | How many distinct user ports (1024-49151) were observed? |
| Distinct dynamic port count, avg, std | How many distinct dynamic and/or Private Ports (49152-65535) were observed? |
| Distinct manufacturer count, avg, std | How many distinct manufacturer's products were identified? |

| Feature Name | Description |
| --- | --- |
| Distinct product count, avg, std | How many distinct products were identified? |
| High-base score CVEs | In some cases, we can map Manufacture, Product and Version information to CVEs, and from that derived base score to as a proxy for vulnerable/exploitable devices. How many high-base-score CVEs were able to be calculated from the products, manufacturer and version numbers identified in scan results? |
| Is threat | Proprietary interpretation of scan responses to identify specific known threats |
| Distinct threat production count, avg, std | How many different products were seen on the IP address? |
| Certificate count, avg, std | How many distinct certificates were observed on the IP address? |
| Self-signed certificate count, avg, std | How many self-signed certificates were seen in domains associated with certificates collected from the IP address? |

Combined pDNS and Certificate Features

In some embodiments, system 300 determines a predicted domain classification based at least in part on combined pDNS and/or certificate aggregate features. System 300 may calculate the number of unique IP addresses and unique /24 subnets for a set of domain names (e.g., all domain names) in a given certificate by joining passive DNS and certificate data for the domain name. In a similar manner to determining certificate aggregation features, system 300 uses the latest certificate for the domain to use in determining per-domain features, and/or system 300 calculates statistics such as min, max, median, average, and JD.

Examples of scan data features are provided below.

| Feature Name | Description |
| --- | --- |
| Certificate pDNS unique IP count | The number of IPs on which the domains in the certificate are hosted |
| Certificate pDNS unique /24 subnet count | The number of distinct /24 subnets on which the domains in the certificate are hosted |
| Certificate pDNS average IP reputation e.g., a malicious proportion | The reputation the hosting IPs of the domains in the certificates |
| Certificate pDNS max /24 subnet reputation e.g., a malicious proportion | The reputation the hosting /24 subnets of the domains in the certificates |

Figure 4:
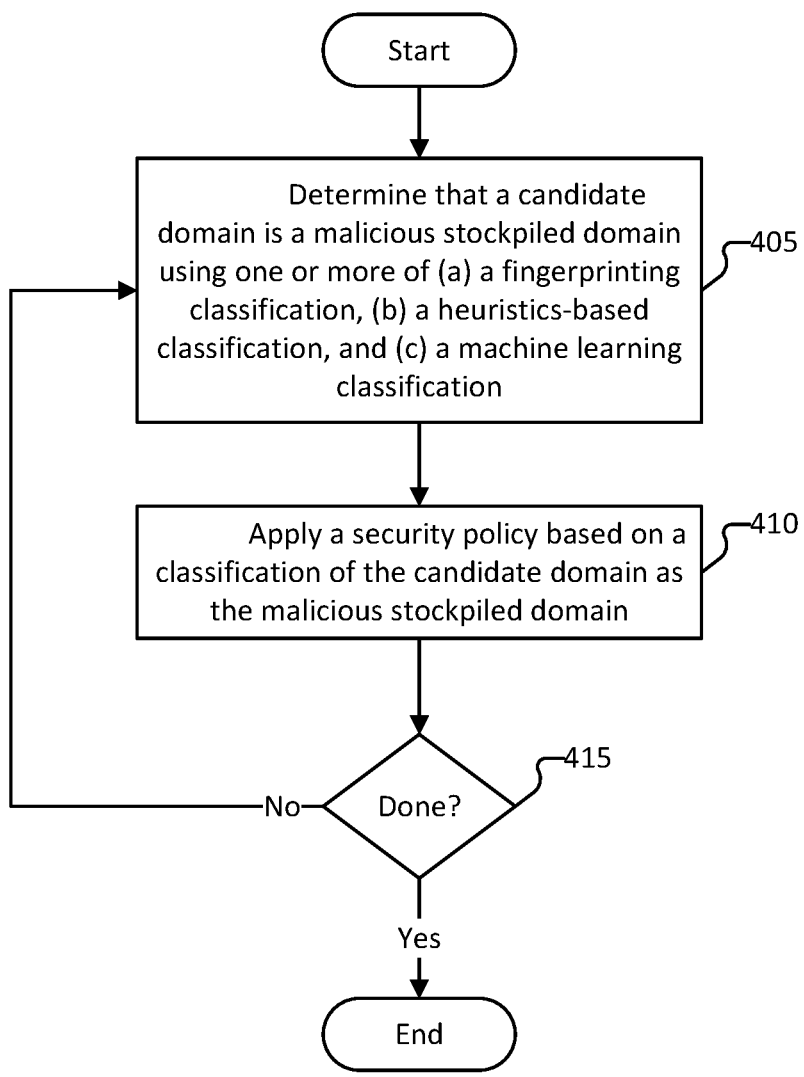
FIG. 4 is a flow diagram of a method for classifying a domain according to various embodiments.

FIG. 4 is a flow diagram of a method for classifying a domain according to various embodiments. In some embodiments, process 400 is implemented at least in part by system 100 of FIG. 1 and/or system 200 of FIG. 2.

At 405, the system determines that a candidate domain is a stockpiled using one or more of (a) a fingerprinting classification, (b) a heuristics-based classification, and (c) a machine learning classification. At 410, the system applies a security policy based on a classification of the candidate domain as the stockpiled domain. At 415, a determination is made as to whether process 400 is complete. In some embodiments, process 400 is determined to be complete in response to a determination that no further candidate domains are to be analyzed (e.g., no further predictions for domains are needed), an administrator indicates that process 400 is to be paused or stopped, etc. In response to a determination that process 400 is complete, process 400 ends. In response to a determination that process 400 is not complete, process 400 returns to 405.

Figure 5:
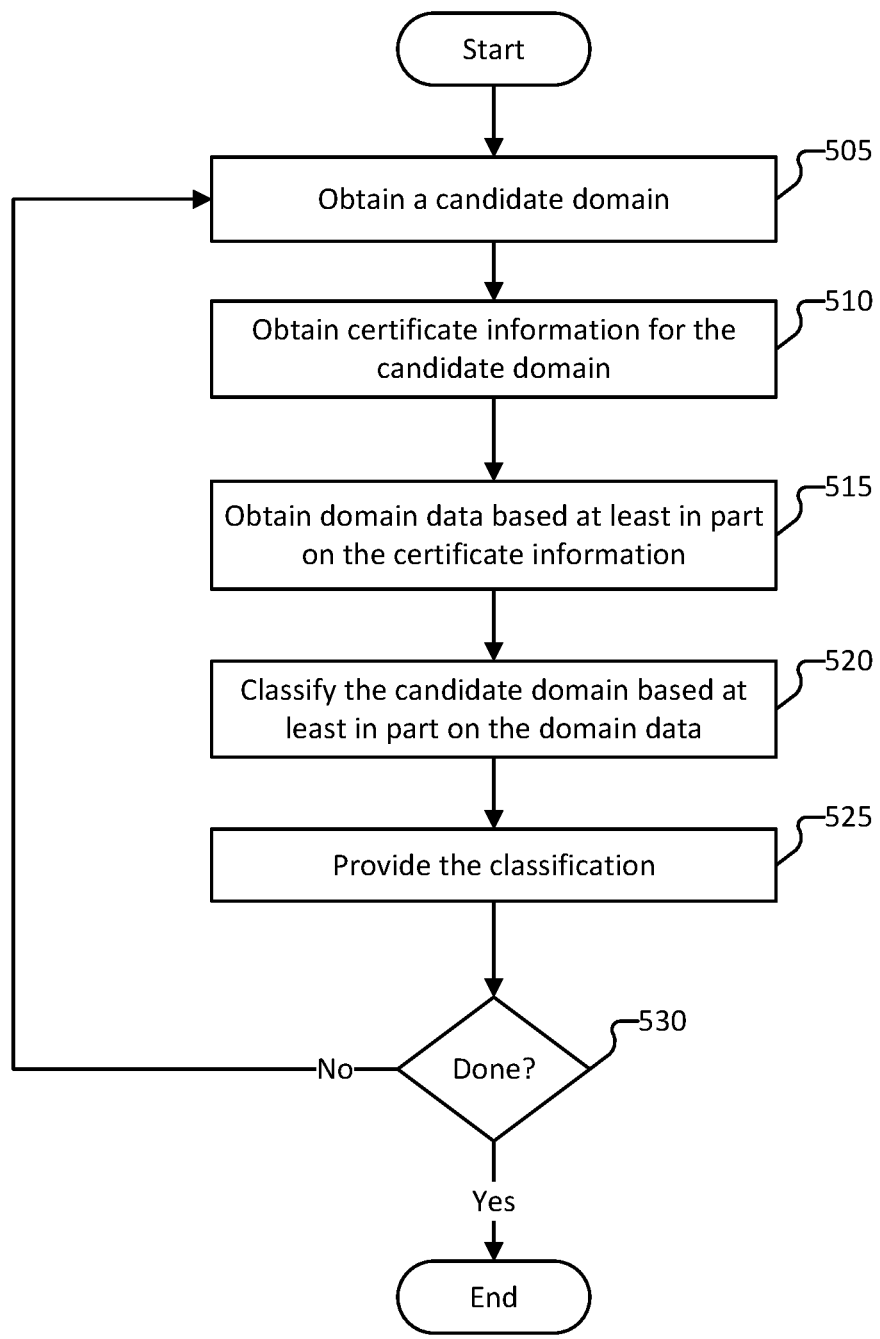
FIG. 5 is a flow diagram of a method for classifying a domain according to various embodiments.

FIG. 5 is a flow diagram of a method for classifying a domain according to various embodiments. In some embodiments, process 500 is implemented at least in part by system 100 of FIG. 1 and/or system 200 of FIG. 2.

At 505, the system obtains a candidate domain. At 510, the system obtains certification information for the candidate domain. At 515, the system obtains domain data based at least in part on the certificate information. At 520, the system classifies the candidate domain based at least in part on the domain data. At 525, the system provides the classification. For example, the system provides an indication of whether the candidate domain is a stockpiled or otherwise malicious domain to a system or process that invoked process 500. At 530, a determination is made as to whether process 500 is complete. In some embodiments, process 500 is determined to be complete in response to a determination that no further candidate domains are to be analyzed (e.g., no further predictions for domains are needed), an administrator indicates that process 500 is to be paused or stopped, etc. In response to a determination that process 500 is complete, process 500 ends. In response to a determination that process 500 is not complete, process 500 returns to 505.

Figure 6:
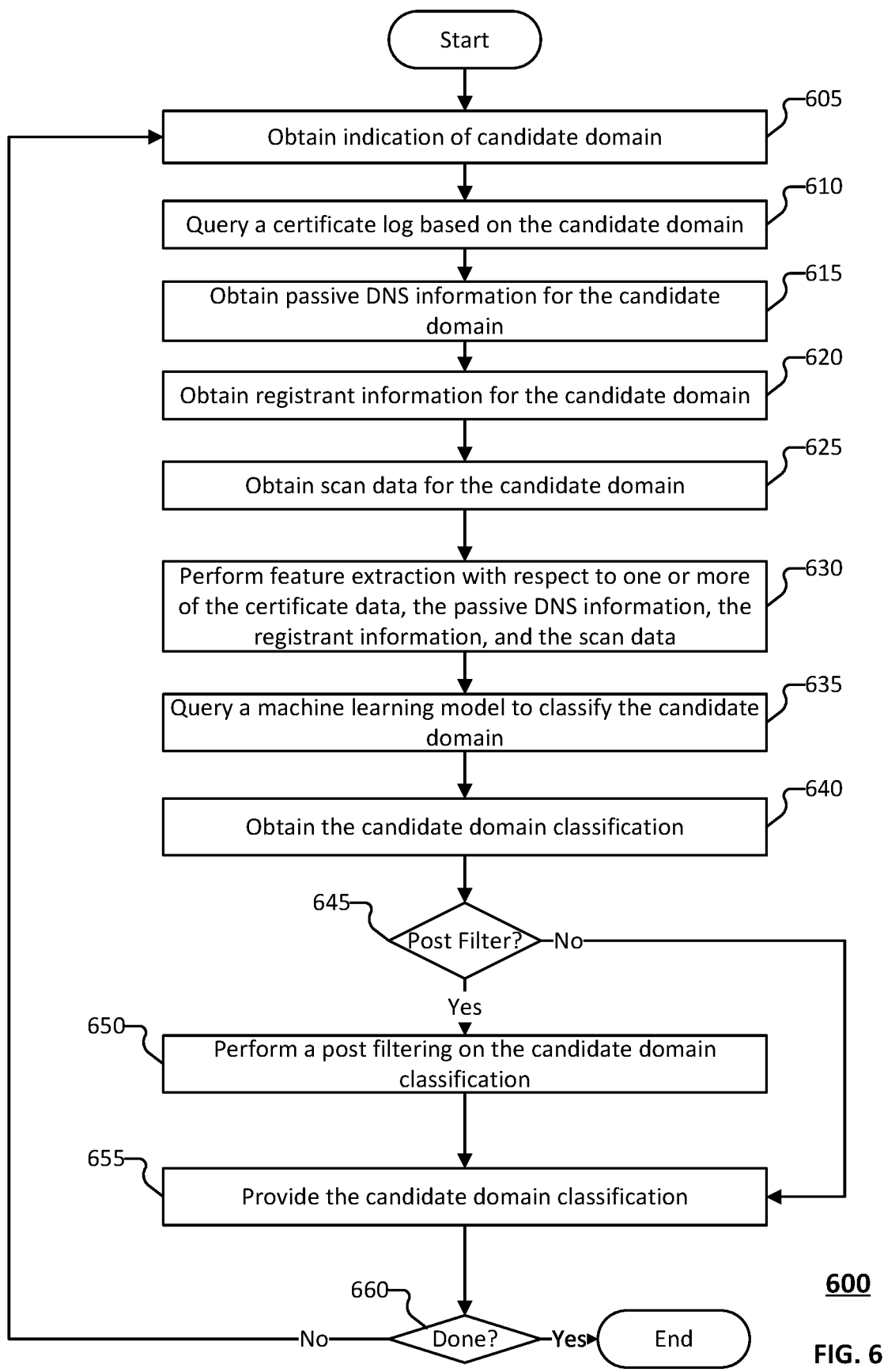
FIG. 6 is a flow diagram of a method for classifying a domain according to various embodiments.

FIG. 6 is a flow diagram of a method for classifying a domain according to various embodiments. In some embodiments, process 600 is implemented at least in part by system 100 of FIG. 1 and/or system 200 of FIG. 2.

At 605, the system obtains an indication of the candidate domain.

At 610, the system queries a certificate log based on the candidate domain. For example, the system uses the candidate domain to obtain certificate information. The certificate information may include one or more certificates for the candidate domains.

At 615, the system obtains passive DNS information from the candidate domain.

At 620, the system obtains registrant information for the candidate domain. The system queries a registrant database (e.g., a WHOIS database) that comprises a mapping of domains to registrant information.

At 630, the system performs feature extraction with respect to one or more of the certificate data, the passive DNS information, the registrant information, and the scan data.

At 635, the system queries a machine learning model to classify the candidate domain.

At 640, the system obtains the candidate domain classification.

At 645, the system determines whether to perform a post-filtering on the candidate domain classification. In response to determining that post-filtering is to be performed on the candidate domain classification at 645, process 600 proceeds to 650. Conversely, in response to determining that post-filtering is not to be performed on the candidate domain classification at 645, process 600 proceeds to 655.

At 650, the system performs a post-filtering on the candidate domain classification.

At 655, the system provides the candidate domain classification. In the event that the post-filtering is performed for the candidate domain classification, the system provides a result of the post-filtering. Alternatively, if post-filtering is not performed, the system provides the candidate domain classification obtained by querying the machine learning model.

At 660, a determination is made as to whether process 600 is complete. In some embodiments, process 600 is determined to be complete in response to a determination that no further domains are to be analyzed (e.g., no further predictions for domains are needed), an administrator indicates that process 600 is to be paused or stopped, etc. In response to a determination that process 600 is complete, process 600 ends. In response to a determination that process 600 is not complete, process 600 returns to 605.

According to various embodiments, the system processes domains in batches. In some embodiments, the system processes domains in parallel. Although process 600 described above is described in connection with serially processing the domains, process 600 may be modified to process a plurality of domains in parallel, such as by using a cluster of virtual machines.

Figure 7:
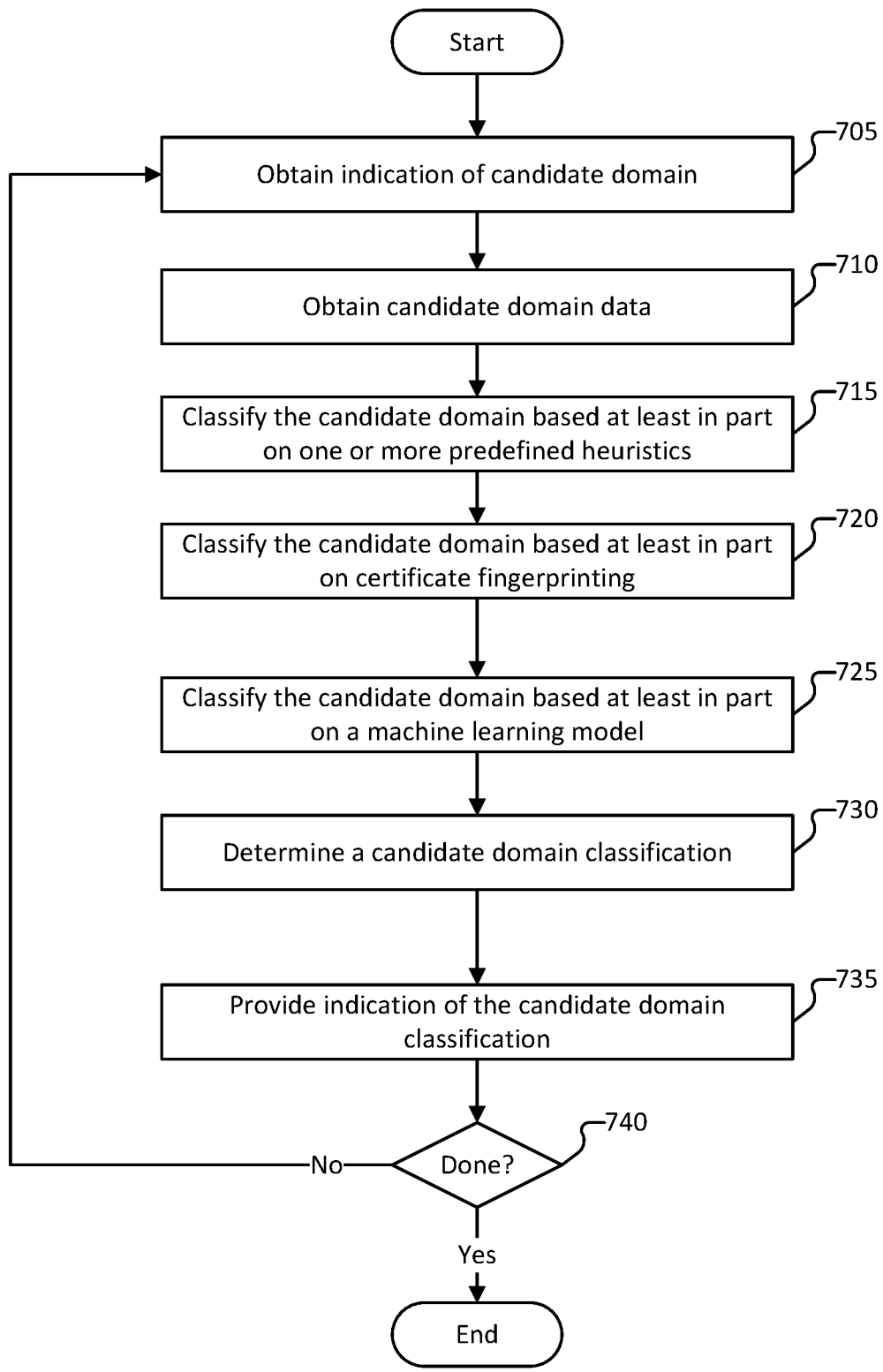
FIG. 7 is a flow diagram of a method for determining whether a domain is a malicious domain according to various embodiments.

FIG. 7 is a flow diagram of a method for determining whether a domain is a malicious domain according to various embodiments. In some embodiments, process 700 is implemented at least in part by system 100 of FIG. 1 and/or system 200 of FIG. 2.

At 705, the system obtains an indication of the candidate domain.

At 710, the system obtains candidate domain data. Examples of candidate domain data include one or more of certification information, pDNS data, registrant information, scan data, etc.

At 715, the system classifies the candidate domain based at least in part on one or more predefined heuristics.

At 720, the system classifies the candidate domain based at least in part on certificate fingerprinting.

At 725, the system classifies the domain based at least in part on a machine learning model.

At 730, the system determines a candidate domain classification. The system may classify the candidate domain based at least in part on the heuristics-based classification, the fingerprinting-based classification, and the machine learning classification. In some embodiments, the system deems the candidate domain as a stockpiled or otherwise malicious domain if any one of the heuristics-based classification, the fingerprinting-based classification, and the machine learning classification classifies the candidate domain as stockpiled or otherwise malicious.

At 735, the system provides the indication of the candidate domain classification.

At 740, a determination is made as to whether process 700 is complete. In some embodiments, process 700 is determined to be complete in response to a determination that no further candidate domains are to be analyzed (e.g., no further predictions for domains are needed), an administrator indicates that process 700 is to be paused or stopped, etc. In response to a determination that process 700 is complete, process 700 ends. In response to a determination that process 700 is not complete, process 700 returns to 705.

Figure 8:
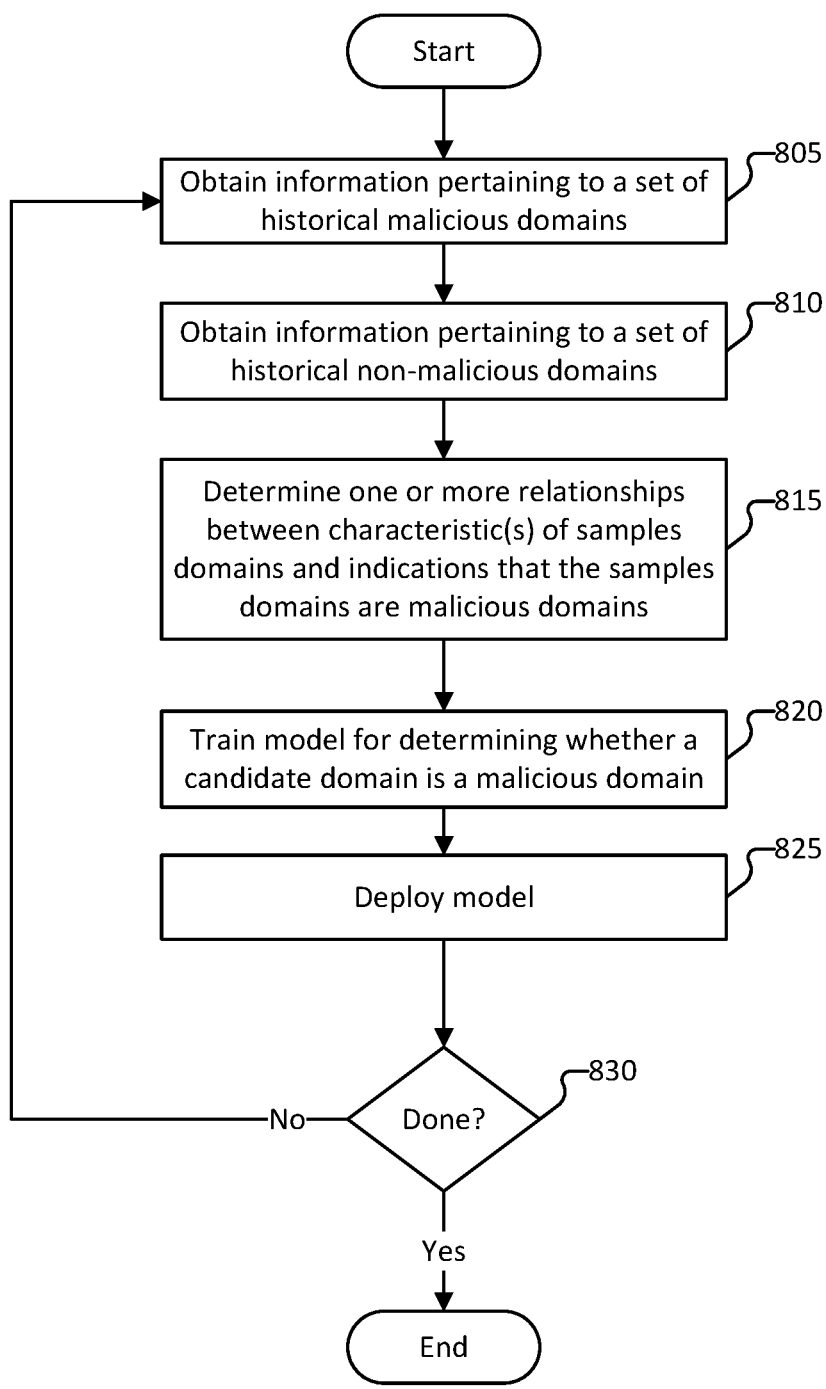
FIG. 8 is a flow diagram of a method for training a model according to various embodiments.

FIG. 8 is a flow diagram of a method for training a model according to various embodiments. In some embodiments, process 800 is implemented at least in part by system 100 of FIG. 1 and/or system 200 of FIG. 2.

At 805, information pertaining to a set of historical malicious domains is obtained. In some embodiments, the system obtains the information pertaining to a set of historical known malicious domains known internally or from a third-party service (e.g., VirusTotal™). At 810, information pertaining to a set of historical known non-malicious domains (e.g., benign domains) is obtained. In some embodiments, the system obtains the information pertaining to a set of historical known benign domains from a third-party service (e.g., VirusTotal™). At 815, one or more relationships between characteristic(s) of domains and indications that the candidate domains are malicious domains. For example, the system determines a set of features to be used by a classifier (e.g., a machine learning model) to classify candidate domains. At 820, a model for determining whether a domain is a stockpiled or otherwise malicious domain is trained. The model may be a machine learning model. For example, the model is trained using a machine learning process. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the model is trained using a long short-term memory networks (LSTM) model. At 825, the model is deployed. In some embodiments, the deploying of the model includes storing the model in a dataset of models for use in connection with analyzing traffic to determine whether the traffic is to/from a stockpiled or otherwise malicious domain. Deploying the model can include providing the model (or a location at which the model can be invoked) to a malicious traffic detector, such as domain classifier 170 of system 100 of FIG. 1, or to system 200 of FIG. 2. At 830, a determination is made as to whether process 800 is complete. In some embodiments, process 800 is determined to be complete in response to a determination that no further models are to be determined/trained (e.g., no further classification models are to be created), an administrator indicates that process 800 is to be paused or stopped, etc. In response to a determination that process 800 is complete, process 800 ends. In response to a determination that process 800 is not complete, process 800 returns to 805.

Figure 9:
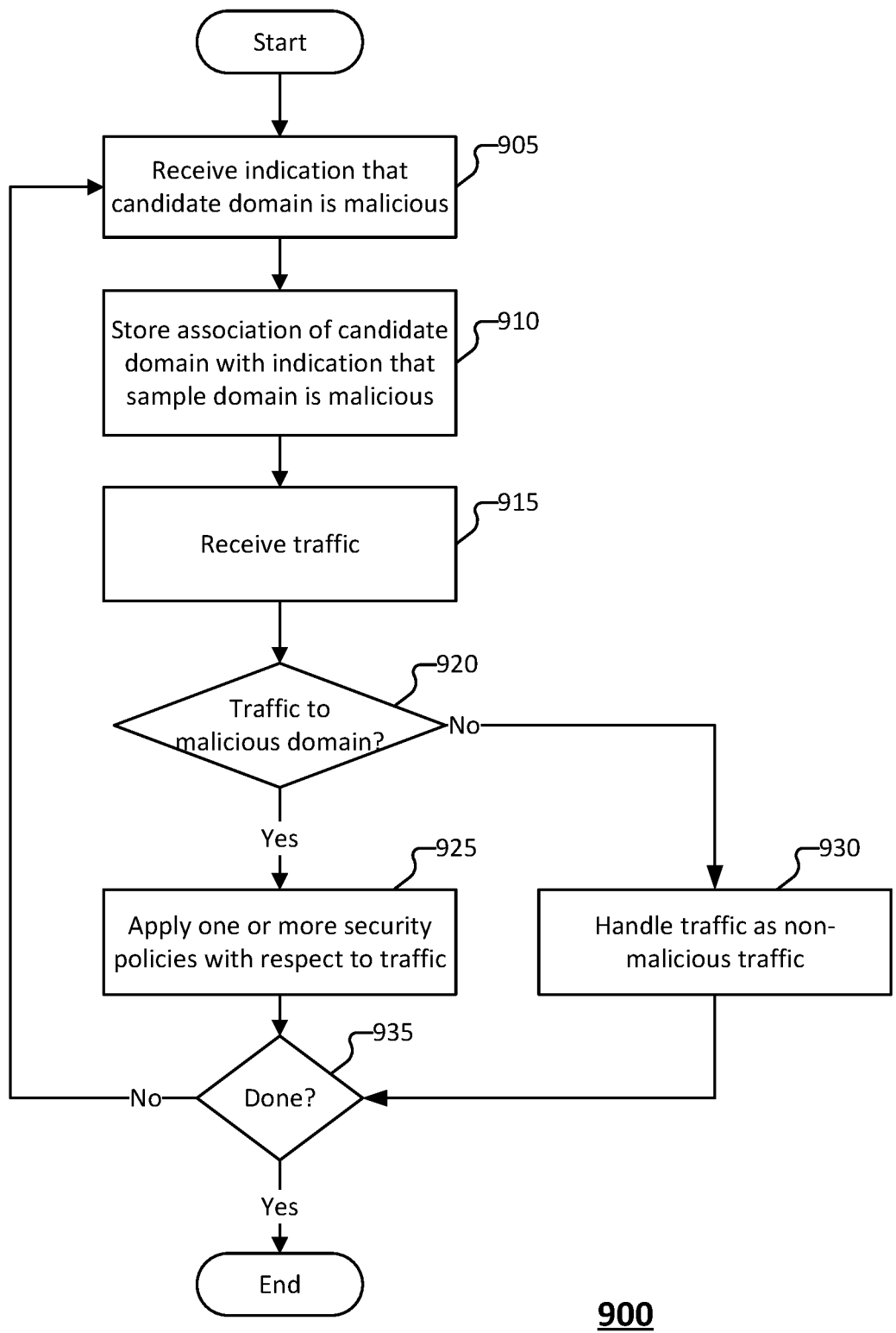
FIG. 9 is a flow diagram of a method for detecting malicious traffic according to various embodiments.

FIG. 9 is a flow diagram of a method for detecting a malicious domain according to various embodiments. In some embodiments, process 900 is implemented at least in part by system 100 of FIG. 1 and/or data appliance 102 of FIGS. 2A and 2B. Process 900 may be implemented by an inline security entity.

In some implementations, process 900 may be implemented by one or more servers, such as in connection with providing a service to a network (e.g., a security entity and/or a network endpoint such as a client device). In some implementations, process 900 may be implemented by a security entity (e.g., a firewall) such as in connection with enforcing a security policy with respect to traffic from/to domains across a network or in/out of the network. In some implementations, process 900 may be implemented by a client device such as a laptop, a smartphone, a personal computer, etc., such as in connection with executing or opening a file such as an email attachment.

At 905, an indication that the candidate domain is stockpiled (or otherwise malicious) is received. In some embodiments, the system receives an indication that a candidate domain is stockpiled, and the domain or hash, signature, or other unique identifier associated with the domain. For example, the system may receive the indication that the domain is stockpiled from a service such as a security or malware service. The system may receive the indication that the domain is stockpiled from one or more servers.

According to various embodiments, the indication that the candidate domain is a stockpiled domain is received in connection with an update to a set of previously identified stockpiled or malicious domains. For example, the system receives the indication that the candidate domain is a stockpiled domain as an update to a blacklist of malicious domains.

At 910, an association of the candidate domain with an indication that the domain is a stockpiled domain is stored. In response to receiving the indication that the domain is a stockpiled domain, the system stores the indication that the domain is a stockpiled domain (or otherwise malicious) in association with the domain or an identifier corresponding to the domain to facilitate a lookup (e.g., a local lookup) of whether subsequently received traffic is to/from malicious domains (e.g., stockpiled domains). In some embodiments, the identifier corresponding to the domain stored in association with the indication that the domain is a stockpiled domain comprises a hash of the domain, a signature of the domain, or another unique identifier associated with the domain.

At 915, traffic is received. The system may obtain traffic such as in connection with routing traffic within/across a network, or mediating traffic into/out of a network such as a firewall, or a monitoring of email traffic or instant message traffic. The traffic may be obtained based on the inline security entity monitoring application traffic or network traffic.

At 920, a determination of whether the traffic is to a stockpiled or otherwise malicious domain is performed. In some embodiments, the system obtains a candidate domain from the received traffic. In response to obtaining the candidate domain from the traffic, the system determines whether the candidate domain corresponds to a domain comprised in a set of previously identified stockpiled or otherwise malicious domains such as a blacklist of malicious domains. In response to determining that the candidate domain is comprised in the set of domains on the blacklist of malicious domains, the system determines that the domain is a stockpiled or otherwise malicious domain.

In some embodiments, the system determines whether the candidate domain corresponds to a domain comprised in a set of previously identified benign domains such as a whitelist of benign domains. In response to determining that the candidate domain is comprised in the set of domains on the whitelist of benign domains, the system determines that the domain is not malicious.

According to various embodiments, in response to determining the candidate domain is not comprised in a set of previously identified malicious domains (e.g., a blacklist of malicious domains) or a set of previously identified benign domains (e.g., a whitelist of benign domains), the system deems the domain as being non-malicious (e.g., benign).

According to various embodiments, in response to determining the candidate domain is not comprised in a set of previously identified malicious domains (e.g., a blacklist of malicious domains) or a set of previously identified benign domains (e.g., a whitelist of benign domains), the system queries a malicious domain detector (e.g., a stockpiled domain detector) to determine whether the candidate domain is a stockpiled domain or additionally or alternatively, a malicious domain. For example, the system may quarantine traffic to/from the domain until the system receives response from the malicious domain detector as to whether the domain is stockpiled or otherwise malicious. The malicious domain detector may perform an assessment of whether the candidate domain is stockpiled or otherwise malicious such as contemporaneous with the handling of the traffic by the system (e.g., in real-time with the query from the system). The malicious domain detector may correspond to domain classifier 170 of system 100 of FIG. 1.

In some embodiments, the system determines whether the candidate domain is comprised in the set of previously identified malicious domains or the set of previously identified benign domains by computing a hash or determining a signature or other unique identifier associated with the domain and performing a lookup in the set of previously identified malicious domains or the set of previously identified benign domains for a domain matching the hash, signature or other unique identifier. Various hashing techniques may be implemented.

In response to a determination that the traffic does not correspond to traffic to/from a stockpiled or malicious domain at 920, process 900 proceeds to 930 at which traffic to/from the domain is handled as non-malicious traffic/information.

Conversely, in response to a determination that the traffic corresponds to traffic to/from a stockpiled or malicious domain at 920, process 900 proceeds to 925 at which traffic to/from the domain is handled as malicious traffic/information. The system may handle the malicious traffic/information based at least in part on one or more policies such as one or more security policies.

According to various embodiments, the handling of the malicious traffic/information (e.g., traffic to/from a stockpiled domain) may include performing an active measure. The active measure may be performed in accordance (e.g., based at least in part on) one or more security policies. As an example, the one or more security policies may be preset by a network administrator, a customer (e.g., an organization/company) to a service that provides detection of malicious domains, etc. Examples of active measures that may be performed include: isolating the traffic to/from the malicious domain (e.g., quarantining the traffic), deleting the traffic, prompting the user to alert the user that a malicious domain was detected, providing a prompt to a user when the a device attempts to open access the domain, blocking transmission of information to/from the domain, updating a blacklist of malicious domains (e.g., a mapping of a hash for the domain to an indication that the candidate domain is malicious, etc.

At 935, a determination is made as to whether process 900 is complete. In some embodiments, process 900 is determined to be complete in response to a determination that no further domains are to be analyzed (e.g., no further predictions for domains are needed), an administrator indicates that process 900 is to be paused or stopped, etc. In response to a determination that process 900 is complete, process 900 ends. In response to a determination that process 900 is not complete, process 900 returns to 905.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
determine that a candidate domain is a malicious stockpiled domain using one or more of (a) a fingerprinting-based classification, (b) a heuristics-based classification, and (c) a machine learning-based classification; and apply a security policy based on a classification of the candidate domain as the malicious stockpiled domain, wherein applying the security policy based on the stockpiled domain comprises:
  handling traffic to/from the stockpiled domain based at least in part on (i) a classification that the candidate domain is the malicious stockpiled domain, and (ii) the security policy; and
a memory coupled to the one or more processors and configured to provide the one or more processors with instructions.

2. The system of claim 1, wherein the machine learning-based classification is performed based at least in part classifying a candidate domain based on a Random Forest machine learning model.

3. The system of claim 1, wherein the candidate domain is deemed the malicious stockpiled domain if any one of the fingerprinting classification, the heuristics-based classification, or the machine learning classification classifies the candidate domain as the malicious stockpiled domain.

4. The system of claim 1, wherein the candidate domain is classified as the malicious stockpiled domain prior to malicious actors using the malicious stockpiled domain in an attack.

5. The system of claim 1, wherein determining that the candidate domain is malicious stockpiled domain comprises:
  obtaining one or more certificates for the candidate domain; and
  performing a classification of the candidate domain based at least in part on one of the certificates for the candidate domain.

6. The system of claim 5, wherein the one or more certificates are obtained from a certificate log.

7. The system of claim 5, wherein performing the classification of the candidate domain comprises:
  obtaining DNS information pertaining to the candidate domain from a passive DNS (pDNS) dataset; and
  performing the classification of the candidate domain based at least in part on the DNS information pertaining to the candidate domain.

8. The system of claim 5, wherein performing the classification of the candidate domain comprises:
  obtaining registrant information pertaining to the candidate domain from a domain registrar dataset; and
  performing the classification of the candidate domain based at least in part on the registrant information pertaining to the candidate domain.

9. The system of claim 5, wherein performing the classification of the candidate domain comprises:
  determining an internet protocol (IP) address pertaining to the candidate domain;
  obtain scan information pertaining to the candidate domain based at least in part on using the IP address to perform a scan; and
  performing the classification of the candidate domain based at least in part on the scan information pertaining to the candidate domain.

10. The system of claim 9, wherein performing the classification of the candidate domain based at least in part on the scan information pertaining to the candidate domain:
  determining that the candidate domain is malicious in response to determining that the scan information comprises a threat fingerprint for malicious software running on a system associated with the IP address associated with the candidate domain.

11. The system of claim 5, wherein performing the classification of the candidate domain comprises:
  obtaining registrant information, DNS log information, IP addresses, and scan data for the candidate domain;
  extract one or more features based on the registrant information, DNS log information, the IP addresses, and scan data for the candidate domain;
  use the one or more features to query a machine learning model to classify the candidate domain; and
  determine whether the candidate domain is malicious based at least in part on a response from the machine learning model.

12. The system of claim 1, wherein the heuristics-based classification comprises using a set of predefined heuristics rules to determine whether the candidate domain is malicious.

13. The system of claim 1, wherein the fingerprinting classification comprises:
  obtaining one or more certificates for the candidate domain;
  extract a set of certificate fields from the one or more certificate;
  match the set of certificate fields with a predefined set of characteristics indicative of a malicious domain; and
  determine whether the candidate domain is malicious based at least in part on a matching of the set of certificate fields with a predefined set of characteristics indicative of the malicious domain.

14. The system of claim 1, wherein the machine learning classification comprises:
  obtaining one or more certificates for the candidate domain;
  obtain domain information based at least in part on the one or more certificates;
  extract a set of features from the domain information;
  query a machine learning model based on the set of features; and
  determine whether the candidate domain is malicious based at least in part on a response from the machine learning model.

15. The system of claim 14, wherein the set of features include one or more features selected from: certificate reputation-based features, certificate aggregation features, certificate domain aggregation features, domain name lexical features, certificate lexical features, pDNS reputation features, pDNS aggregation features, scan features, whois features, and combined pDNS and certificate aggregate features.

16. The system of 1, wherein:
  classification of the candidate domain as malicious or non-malicious is based at least in part on certificate information for the candidate domain; and
  the certificate information is obtained from one or more of (a) certificate transparency logs, (b) self-signed and certificate authority-signed certificates from Internet-wide scanning data, (c) passive DNS data, (d) active DNS data, (e) WHOIS registrant data, (f) web traffic logs, and (g) Internet-wide scan data.

17. A method, comprising:
  determining, by one or more processors, that a candidate domain is a malicious stockpiled domain using one or more of (a) a fingerprinting classification, (b) a heuristics-based classification, and (c) a machine learning classification; and
  applying a security policy based on a classification of the candidate domain as the malicious stockpiled domain, wherein applying the security policy based on the stockpiled domain comprises:
    handling traffic to/from the stockpiled domain based at least in part on (i) a classification that the candidate domain is the malicious stockpiled domain, and (ii) the security policy.

18. A computer program product embodied in a non-transitory computer readable medium and comprising computer instructions for:
    determining, by one or more processors, that a candidate domain is a malicious stockpiled domain using one or more of (a) a fingerprinting-based classification, (b) a heuristics-based classification, and (c) a machine learning-based classification; and
    applying a security policy based on a classification of the candidate domain as the malicious stockpiled domain, wherein applying the security policy based on the stockpiled domain comprises:
        handling traffic to/from the stockpiled domain based at least in part on (i) a classification that the candidate domain is the malicious stockpiled domain, and (ii) the security policy.

19. A system, comprising:
    one or more processors configured to:
        obtain a set of training candidate domains;
        obtain domain information for the set of training candidate domains;
        perform a machine learning process to generate a stockpiled domain classifier; and
        deploy the stockpiled domain classifier in a system to perform near real-time detection of malicious stockpiled domains, wherein deploying the stockpiled domain classifier comprises:
            causing a security policy to be applied in response to the stockpiled domain classifier classifying the stockpiled domain classifier of the candidate domain as a malicious stockpiled domain; and
    a memory coupled to the one or more processors and configured to provide the one or more processors with instructions.

* * * * *